US011783831B1

(12) United States Patent
Lantin et al.

(10) Patent No.: US 11,783,831 B1
(45) Date of Patent: Oct. 10, 2023

(54) DATA PROTECTION IN A MULTI-ASSISTANT SYSTEM

(71) Applicant: Amazon Technologies, Inc., Seattle, WA (US)

(72) Inventors: Philippe Andre Lantin, Bainbridge Island, WA (US); Ori Neidich, Scarsdale, NY (US); David Berol, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 17/361,664

(22) Filed: Jun. 29, 2021

(51) Int. Cl.
*G10L 15/22* (2006.01)
*G10L 15/08* (2006.01)
*H04L 9/14* (2006.01)
*G10L 15/04* (2013.01)

(52) U.S. Cl.
CPC .............. *G10L 15/22* (2013.01); *G10L 15/04* (2013.01); *G10L 15/08* (2013.01); *H04L 9/14* (2013.01); *G10L 2015/088* (2013.01); *G10L 2015/223* (2013.01)

(58) Field of Classification Search
CPC ......... G10L 15/22; G10L 15/04; G10L 15/08; G10L 2015/088; G10L 2015/223; H04L 9/14
See application file for complete search history.

(56) References Cited

U.S. PATENT DOCUMENTS

| 9,124,386 | B2 * | 9/2015 | Dadu | G06F 21/32 |
| 9,940,930 | B1 * | 4/2018 | Campbell | G10L 15/22 |
| 10,237,268 | B2 * | 3/2019 | Price | H04L 63/083 |
| 11,516,541 | B2 * | 11/2022 | Park | H04L 63/0861 |
| 2014/0143533 | A1 * | 5/2014 | Ganong, III | H04L 63/0861 |
| | | | | 713/150 |
| 2019/0342339 | A1 * | 11/2019 | Nanda | G06F 21/62 |
| 2020/0380139 | A1 * | 12/2020 | Kashani | G06F 21/602 |
| 2021/0067829 | A1 * | 3/2021 | Park | H04L 9/0656 |
| 2021/0390960 | A1 * | 12/2021 | Lesso | H04L 63/123 |

FOREIGN PATENT DOCUMENTS

WO   WO-2007004992 A1 *   1/2007   ............. H04K 1/00

\* cited by examiner

*Primary Examiner* — Brian L Albertalli
(74) *Attorney, Agent, or Firm* — PIERCE ATWOOD LLP

(57) ABSTRACT

A user may access multiple virtual assistants via a voice-enabled device. The device may receive a command from the user, detect a wakeword corresponding to one of the assistants, and send audio data to a command processing system corresponding to the selected assistant. The device transmits encrypted audio data to one or more systems and, upon detecting a wakeword or wake command corresponding to one of the systems, the device may provide an encryption key to that particular system. The system may decrypt and process the audio data without additional latency introduced by having to wait for the audio data to arrive.

20 Claims, 15 Drawing Sheets

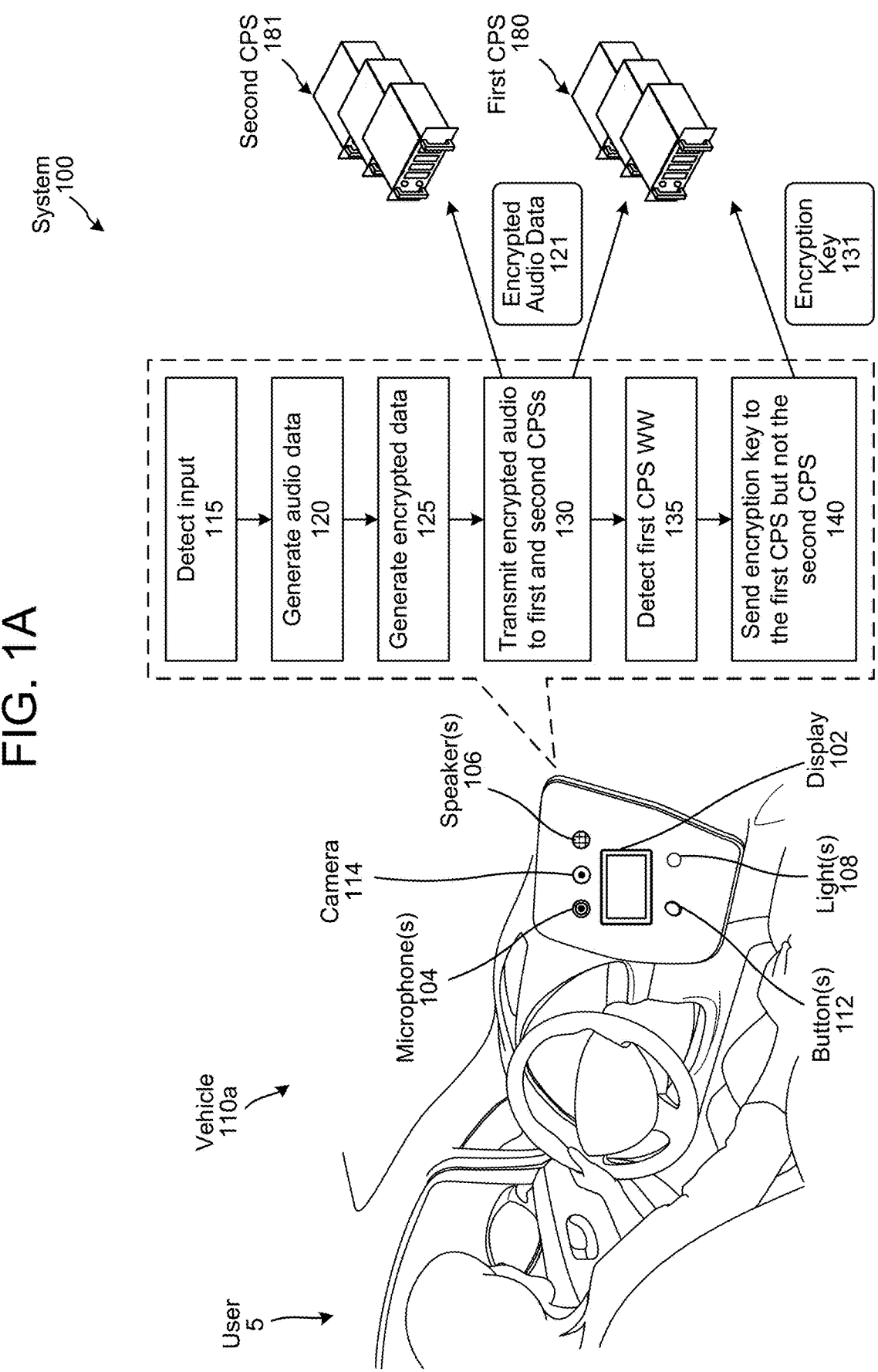

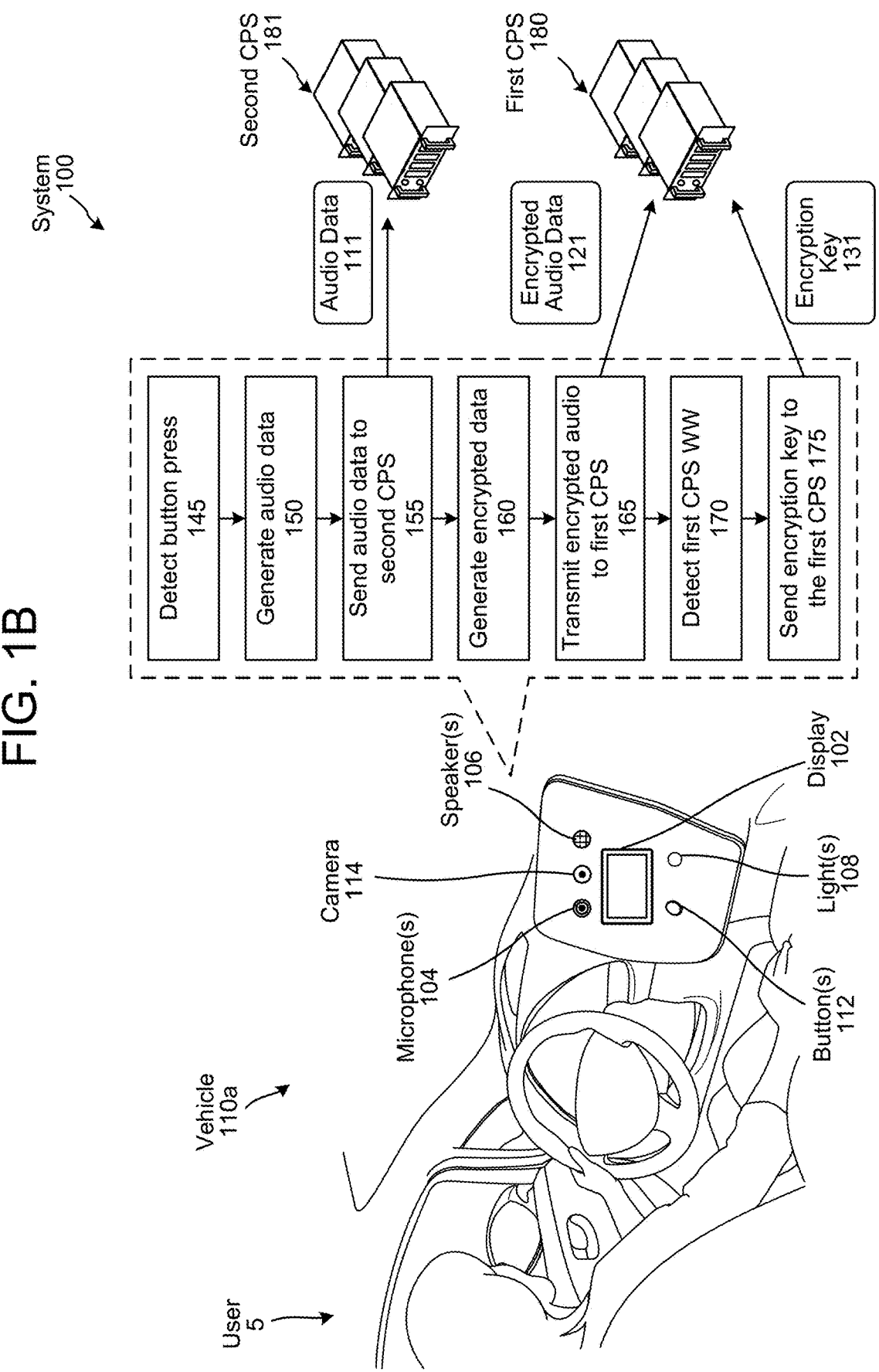

DATA PROTECTION IN A MULTI-ASSISTANT SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating example operations of audio protection in a multi-assistant system, according to embodiments of the present disclosure.

FIG. 1B is a conceptual diagram illustrating example operations of audio protection in a multi-assistant system where a button press invokes a default assistant, according to embodiments of the present disclosure.

DETAILED DESCRIPTION

Figure 2:
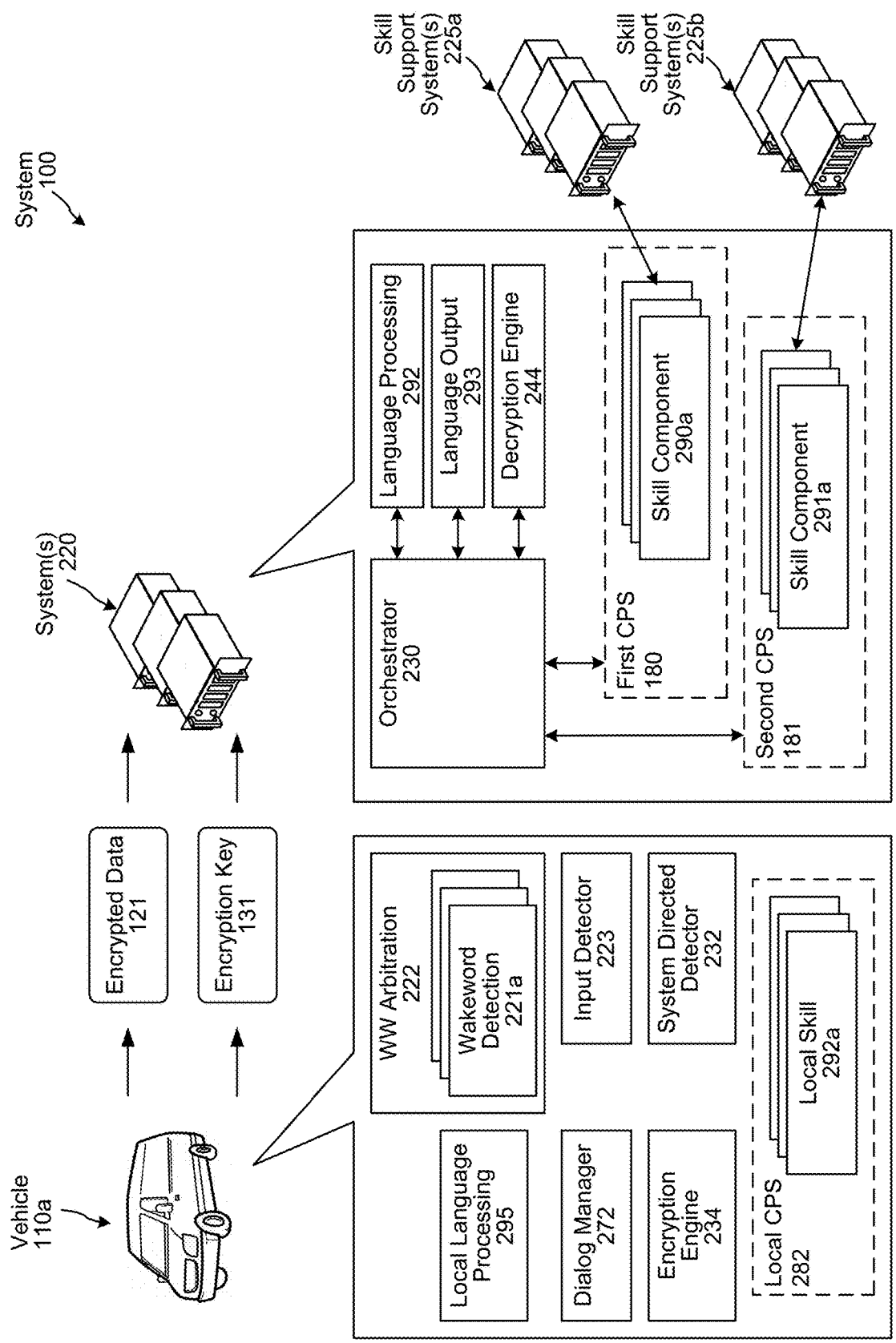
FIG. 2 is a block diagram illustrating components for audio protection in a multi-assistant system, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-interface system. The virtual assistant can leverage the speech-interface system as well as additional applications and/or skills to perform tasks for and/or on behalf of the user.

Some systems may provide a user with access to multiple different virtual assistants. A user may activate an assistant by speaking a wakeword corresponding to the assistant while near a voice-enabled device. For example, a user may invoke a first assistant using the wakeword "Alexa," and a second assistant using the wakeword "Carja," which may correspond to a virtual assistant associated with a vehicle-type device. In some cases, the user may activate an assistant by making a gesture such as a button press or other non-verbal movement detectable by the device. For example, the user may invoke the first assistant with a tap-to-talk gesture and a second assistant using a press-and-hold gesture. Other wakewords and/or gestures may be linked to these or other assistants.

When a voice assistant is activated, the device may transmit audio data representing the user's speech to this assistant. The device may begin capturing audio upon detecting a button press. To ensure that the audio data goes only to the intended assistant, however, the device may verify detection of a wakeword prior to transmitting the audio data. Verifying the wakeword may take a certain amount of time, and transmitting the audio data may take an additional amount of time. The sum of the time spent verifying the wakeword and transmitting the audio data results in latency between the spoken command and execution of the requested action. Too much latency may result in an undesired user experience.

To reduce latency while preventing an unintended recipient from accessing the audio data, the device may encrypt the audio data and begin transmitting the encrypted data without waiting for wakeword verification. The device may send the encrypted data to remote systems corresponding to any or all virtual assistants available via the device or enabled for use on the device. Upon verifying detection of a wakeword, the device may send an encryption key to the system corresponding to the wakeword. The system/subsystem that receives the key may decrypt the previously received encrypted audio data and begin processing the decrypted data immediately. Because encrypting and decrypting the data can occur more quickly than transmitting the data, this approach may reduce latency. In some cases, the device may terminate streaming of data to other systems (e.g., those for which a wakeword was not detected). In some cases, the device may stream subsequent audio data to the invoked system without encryption (other than any standard encryption used in the data connection between the device and the system). Although this disclosure describes example operations of systems and methods using audio data in the context of speech processing, application of these techniques is not so limited, and may be additionally or alternatively used for protected transmission of various other forms of data including and without limitation: still image and/or video data (e.g., for optical character recognition, face detection, and/or other computer vision functions), wireless signals indicating presence of other devices/people, usage history, on-screen content displayed on the device, sensor data, etc.

In some cases, the device may detect a button activation and begin streaming encrypted audio data. If the device does not detect a wakeword in the audio, however, the device may withhold the encryption key and/or terminate streaming. For example, the device may withhold the encryption key and/or terminate streaming if it does not detect a wakeword within a certain period of time, prior to detecting a release of the button, and/or prior to detecting a speech end point.

In some cases, the device may be encrypted using multiple unique encryption keys, where one key can decrypt the data to yield audio data having lower fidelity, and a second key can decrypt the data to yield audio data having higher fidelity; for example, one or more of a higher bit rate, resolution, and/or bandwidth. The lower fidelity audio data may be adequate for voice communication between users (e.g., leaving a voice mail, sending a voice memo, or conducting a real-time voice conversation), but higher fidelity audio data may result in more accurate speech recognition. In some cases, the device may provide additional keys for decrypting the data to yield audio data having various levels of fidelity. In some cases, the device may alter the audio data in a manner that produces an audio signal in which the speech is intelligible but the speaker cannot be identified.

In some cases, the device may include one or more local speech-processing components. The device may send unencrypted audio data to a local speech-processing component and encrypted audio data to a remote speech processing system. If the local speech-processing component returns an indication that it cannot perform an action responsive to the audio data, the device may deliver the encryption key to the remote speech processing system for fallback processing of the audio data.

In some cases, encrypted audio data may be sent to a first remote system and a second remote system. A detected wakeword may correspond to the first system; however, upon receiving the encryption key and decrypting the data, the first system may determine that it cannot perform an action responsive to the audio data and/or that the second system should process the command instead. This could be due to the user saying the wrong wakeword, because the first system cannot process commands pertaining to a domain represented in the audio data, because the first system cannot process the language/dialect/accent of speech used, and/or some other reason. The first system may return an indication to the device that the first system cannot process the command and/or that the second system should process the command instead. In response, the device may send the encryption key to the second system and/or terminate streaming of data corresponding to the received command to the first system.

The aforementioned features are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating example operations of audio protection in a multi-assistant system 100, according to embodiments of the present disclosure. A user 5 may use a device 110 such as a vehicle-based device 110*a* ("vehicle 110*a*") to access one or more virtual assistants. A first virtual assistant may correspond to first command processing subsystem (CPS) 180 and a second virtual assistant may correspond to a second CPS 181. The user 5 may interact with the virtual assistants using input and output features of the vehicle 110*a*. For example, the user 5 may press a button 112 and speak into the microphone 104 to invoke a virtual assistant. The button press may correspond to a default virtual assistant. The CPS 180 or 181 corresponding to the default virtual assistant may processing the spoken command and perform a requested action, such as playing music, rolling up the windows, providing navigation, etc. Results of the command may be delivered to the user via a display 102, a speaker 106, or with performance of the requested action (e.g., rolling up the windows). The display 102 and/or a light 108 may provide an indication of which virtual assistant is currently active. The "active" virtual assistant may be the one corresponding to the button 112, a detected wakeword, or a virtual assistant selected by a remote system for performing the requested action. Such indications can notify the user which virtual assistant is currently listening to the user's 5 speech, processing the command, and/or providing results. In some cases, a camera 114 may receive image data that the system can process to determine an object of the user's attention and/or whether the user is directing attention to the system 100 (e.g., as opposed to speaking on the phone or to someone else in the vehicle 110*a*). Determining a user's 5 attention, in particular determining whether a user input is directed at a system, is discussed in additional detail below with reference to FIG. 11.

In some cases, the vehicle 110*a* may begin capturing audio upon detecting a press of the button 112; however, the vehicle 110*a* may not begin sending audio data to a CPS 180 or 181 until it has detected a corresponding wakeword. In this manner, the vehicle 110*a* may verify that the user 5 intends for the particular CPS 180 or 181 to receive the audio data. For example, in some cases, the user 5 may press the button 112 which may correspond to the first CPS 180 but the vehicle may subsequently detect a wakeword corresponding to the second CPS 181; therefore, the vehicle 110*a* should send the audio data to the second CPS 181 but not the first CPS 180. The vehicle 110*a* takes some time to verify a wakeword in the speech and takes still more time to transmit the audio data to the corresponding CPS 180 or 181. To reduce latency, the vehicle 110*a* may encrypt the audio data and send it to both CPSs 180 and 181; for example, without waiting for wakeword verification. Upon verifying a wakeword, the vehicle 110*a* can send an encryption key to the corresponding CPS 180 or 181. In this manner, the system 100 need not delay transmitting the audio data, yet no audio data will not be accessible to the CPS 180 or 181 other than the one invoked. The following example operations illustrate how the system 100 may provide audio protection in a multi-assistant system. In some implementations, the system 100 may perform fewer, different, or additional steps; or perform the steps in different order or during overlapping time periods. In some implementations, the system 100 may include fewer or more virtual assistants and/or CPSs 180 and 181.

At a stage 115, the system 100 may detect an input. The vehicle 110*a* may detect a press of the button 112, speech received at the microphone 104, a user 5 gesture detected by the camera 114, etc. At a stage 120, the system 100 may begin generating audio data based on audio received at the microphone 104 after detecting the input. The audio data may represent an utterance spoken by the user 5. In some implementations, the system 100 may generate the audio data in portions and encrypt each portion with a different encryption key such that a remote system may access a first portion of the audio data using a first encryption key and a second portion of the audio data using the second encryption key. In this manner, the vehicle 110*a* may send the CPS 180 and/or 181 one or both encryption keys depending on the quality of audio to be provided to the CPS 180 or 181.

At a stage 125, the system 100 may generate encrypted audio data. The vehicle 110*a* may generate an encryption key (or multiple encryption keys) and use an encryption algorithm to encrypt the audio data using the encryption key, as described further below with reference to FIG. 5. In some implementations, the system 100 may encrypt the audio data in portions, with a first portion encrypted with a first key and a second portion encrypted with a second key. A remote system, such as the CPS 180 or 181, may be able to decrypt the encrypted audio data with the first key to access the first portion of audio data, which may yield a relatively low-fidelity audio signal that is nevertheless suitable for communication between humans (e.g., voice mail, voice memo, or telephone call). The CPS 180 or 181 may be able to request access to higher fidelity audio data, in which case the vehicle 110*a* may transmit the second key. The CPS 180 or 181 may use the second key in combination with the first key to access both portions of the audio data, which may then be combined to generate a higher-fidelity audio signal suitable for speech recognition. This process is described in additional detail below with reference to FIG. 6.

At a stage 130, the system 100 may transmit the encrypted audio data 121 to the first CPS 180 and the second CPS 181. The system 100 may begin transmitting the encrypted audio data 121 as the audio data is generated from the captured audio and encrypted using the one or more encryption keys, and before the vehicle 110*a* has detected or verified a wakeword corresponding to either CPS 180 or 181. In addition, the system 100 may still be receiving the audio data, and thus the vehicle 110*a* may be streaming encrypted audio data 121 to the CPS 180 and 181 while still receiving the spoken command from the user. In some implementations, the system 100 may include many CPSs 180, 181, etc. Depending on the input detected at the stage 115, the device may send the encrypted audio data 121 to a subset of the CPSs. For example, if one or more CPSs may be invoke by a press of the button 112, the device 110 may send the encrypted audio data 121 to a subset of CPSs corresponding to a press of the button 112 (e.g., a CPS invoked by press-and-hold and a CPS invoked by tap-to-talk, etc.). In the event the device 110 detects a wakeword, the device 110 may send the encrypted audio data 121 to a subset of CPSs invokable with a wakeword (e.g., "Alexa," "Carja," etc.). The device 110 may determine which assistant to invoke (e.g., using an wakeword arbitration component 222), and send the encryption key 131 to the corresponding CPS 180/181.

At a stage 135, the system may detect a wakeword corresponding to, for example, the second CPS 181 in the audio data. The vehicle 110*a* may include a wakeword detector for detecting wakewords in captured audio. In some implementations, the vehicle 110*a* and/or a remote system associated with one or both of the CPSs 180 or 181 may perform additional wakeword verification during speech recognition. The verification process may include additional verifications, such as system directed input detection. For example, a system directed input detector of the system 100 may determine that the user 5 is looking at the vehicle 110*a* (or other device 110) when speaking. The system 100 may thus determine the speech is intended for the system 100 rather than another person. A system directed input detector is described in additional detail below with reference to FIG. 11.

Upon detecting the wakeword, the vehicle 110*a* may, at a stage 140, transmit one (or more) encryption keys 131 to the corresponding first CPS 180 to cause the first CPS 180 to decrypt the encrypted audio and perform speech processing using the decrypted audio data. Transmitting the encryption key 131 to the first CPS 180 may cause the first CPS 180 to decrypt the encrypted audio data 121, perform speech processing of the decrypted audio data, and/or perform an action in response. Furthermore, the vehicle 110*a* may, upon detecting the wakeword, terminate transmission of any remaking data corresponding to the utterance to any systems or subsystems other than the first CPS 180 corresponding to the wakeword.

In some implementations, the vehicle 110*a* may have some speech processing capabilities and may attempt to process the audio data locally (e.g., using on-device components such as speech processing components and/or command processing skills). Upon detecting an input, the vehicle 110*a* may send unencrypted audio data to a local speech processing component (e.g., an on-device component or a component in a nearby device 110 within the same local network) for processing, while sending the encrypted audio data to the CPSs 180 and 181. If the vehicle 110*a* determines that the local speech processing component can process the audio data and perform the requested action locally (e.g., without assistance from the CPS 180 or 181), the vehicle 110*a* may do so, and withhold encryption keys 131 from the CPSs 180 and 181 and/or terminate the transmission of any remaining data corresponding to the utterance. If, however, the vehicle 110*a* determines that it cannot perform an action responsive to the audio data, the vehicle 110*a* may send the encryption key 131 to one of the CPSs 180 or 181 for processing and/or performance of the requested action. Whether the system 100 performs local (e.g., on-device 110 or in a nearby device 110) or cloud (e.g., by a CPS 180 or 181) execution may depend on various factors such as network conditions (e.g., whether the vehicle 110*a* currently has a connection to the CPSs 180 or 181 having sufficient bandwidth, latency, and/or reliability), complexity of the language in the utterance (e.g., whether local speech models are sufficient for accurate understanding of the utterance), and/or whether a local skill can perform the requested action (e.g., a local skill may be able to control windows of the vehicle 110*a* but not stream music). In some implementations where the audio data is encrypted in portions, the vehicle 110*a* may send one or both encryption key to the first CPS 180; for example, without waiting for an explicit request for the second encryption key. Whether the vehicle 110*a* sends one or both encryption keys may depend on which virtual assistant is invoked; for example, if the first virtual assistant is invoked, the vehicle 110*a* may send only the first encryption key unless it receives a request for the second, while if the second virtual assistant is invoked, the vehicle 110*a* may send both encryption keys.

In some implementations, the system 100 may detect the wakeword corresponding to the first CPS 180 and the vehicle 110*a* may send the encryption key 131 to the first CPS 180; however, upon decrypting the encrypted audio data and attempting to process the audio data, the first CPS 180 may determine that the requested action may be better performed by the second CPS 181. This may be due to the user 5 mistakenly providing the wrong wakeword, because the first CPS 180 cannot parse a language or dialect represented in the decrypted audio data, and/or because the user 5 requested an action that may be performed by a skill associated with the second CPS 181 but not the first CPS 180. The first CPS 180 may return an indication to the vehicle 110*a* that it cannot perform an action responsive to the decrypted audio data. Upon receiving this indication, the vehicle 110*a* may determine to have the second CPS 181 handle the command, and thus send the encryption key 131 to the second CPS 181. The vehicle 110*a* may additional terminate transmission of any remaining data corresponding to the utterance to the first CPS 180.

In some implementations, the button 112 may be linked to a default assistant such that pressing the button 112 causes the device to send audio data to a CPS corresponding to the assistant; e.g., without waiting for a wakeword detection signal. In some cases, however, the device 110 may subsequently detect a wakeword corresponding to the other CPS. The device 110 may determine that the user 5 intended to invoke the assistant corresponding to the wakeword. The device 110 may thus send the encryption key to the CPS associated with the wakeword.

FIG. 1B is a conceptual diagram illustrating example operations of audio protection in a multi-assistant system 100 where a button press invokes a default assistant, according to embodiments of the present disclosure. The device 110 may detect (145) a press of the button 112. The button press may correspond to, for example, the second CPS 181. The device may begin generating (150) audio data corresponding to audio captured by the microphone 104. The device may send (155) the audio data 111 to the second CPS 181 corresponding with the press of the button 112 (e.g., without separately encrypting the audio data 111). The device may generate an encryption key and use it to generate (160) encrypted data representing the audio data 111. The device may transmit (165) the encrypted audio data to the first CPS 180. The device may subsequently detect (170) a wakeword corresponding to the first CPS 180 in the audio data 111. The device 110 may determine based on the detected wakeword and/or other indications that the user 5 intended to invoke the first CPS 180 rather than the second CPS 180. The device 110 may thus send (175) the encryption key to the first CPS 180 for decrypting the audio data and/or performing a responsive action. The device 110 may further close a communications session established with the second CPS 181 by, for example, sending a directive to the CPS 181 to close the communications session associated with the encrypted data 121 and/or terminating transmission of any further data related to the received audio data.

FIG. 2 is a block diagram illustrating components for audio protection in a multi-assistant system 100, according to embodiments of the present disclosure. The system 100 includes a device 110 such as the vehicle 110*a* and a remote system 220. The vehicle 110*a* and the remote system 220 may be in communication over a computer network such as the computer network 199 as described with reference to FIGS. 5, 6, and 14. The vehicle 110*a* and the system 220 may communicate various data with each other including encrypted data 121, encryption keys 131, audio data, text data, image data, and/or directives (e.g., pertaining to actions to be performed by the vehicle 110*a*).

The system 100 may have different configurations as variously described with reference to FIGS. 3 and 4. Speech processing and command execution may occur locally on device 110, in one or more remote systems 220, or partially on device 110 and partially in the remote system 220. Functions of one or more virtual assistants may be performed on a local device 110, in one or more remote systems 220, and/or in one or more CPSs 180 or 181. For example and in some implementations, functions of a first virtual assistant may be performed by a first system 220*a* and functions of a second virtual assistant may be performed by a second system 220*b*. In some implementations, functions of a first virtual assistant may be performed by a first CPS 180 and functions of a second virtual assistant may be performed by a second CPS 181. In some implementations, functions of a virtual assistant may be shared between a remote system 220 and/or a local CPS 282 on the device 110. In some implementations, hardware and/or software resources of the device 110 and/or the system 220 may be shared between different virtual assistants; however, virtual assistants may be walled off from each other to prevent sharing of data related to users 5 and/or the virtual assistants themselves.

The vehicle 110*a* may include an input detector 223 that may, for example, detect a push of an activation button that indicates that the vehicle should begin capturing and processing audio data. The input detector 223 may detect different gestures (e.g., non-verbal inputs detectable by a button and/or camera of the device) that may correspond to different virtual assistants. For example, a button press-and-hold may correspond to a first virtual assistant and a tap-to-talk may correspond to a second virtual assistant, etc. However, the vehicle 110*a* may nevertheless verify the detection of a wakeword before providing unencrypted audio data to a CPS 180 or 181 associated with a virtual assistant.

The vehicle 110*a* may include one or more wakeword detection components 221*a*, 221*b*, and/or 221*c*, which may detect a representation of one or more wakewords in audio data. For example, a first wakeword detection component may detect a first wakeword corresponding to a first virtual assistant, a second wakeword detection component 221*b* may detect a second wakeword corresponding to a second virtual assistant, etc. In some implementations, a wakeword detection component 221 may detect multiple wakewords corresponding to a single virtual assistant. In some implementations, a wakeword detection component 221 may detect different wakewords corresponding to different virtual assistants. In some implementations, the vehicle 110a may begin capturing audio and generating audio data upon detecting a wakeword. In some implementations, the vehicle 110a may begin capturing audio and generating audio data upon detecting an input—e.g., with the input detector 223—and may begin encrypting and transmitting the audio data to one or more remote systems 220 and/or one or more CPSs 180 or 181. Upon verification of a wakeword by the wakeword detection component 221, the vehicle 110a may send an encryption key for decrypting the encrypted audio data to a system 220 or CPS 180 or 181 corresponding to the wakeword.

A wakeword detection component 221 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 221 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context data, either by stacking frames within a context window for DNN, or using RNN. Following on posterior threshold tuning or smoothing is applied for decision making. Other techniques for wakeword detection, such as those known in the art, may also be used.

In some implementations, the device 110 and/or the system 220 may include a wakeword arbitration component 222. The arbitration component 222 may include software, logic, and/or models for arbitrating between competing wakeword detection signals; for example, when an utterance includes two or more wakewords. The arbitration component 222 may determine which assistant should be invoked based on position in the audio data (e.g., favoring the wakeword spoken first) and/or based on language processing results data from the local language processing components 295. The language processing results data may indicate that one of the wakewords in the utterance is likely an entity associated with an intent, or that an intent and/or entity corresponds to one of the wakewords but not the other. For example, the local language processing components 295 may determine that a command in the utterance corresponds to a feature of the car; therefore, based on the language processing results data, the wakeword arbitration component may determine that an invocation of "Carja" should be favored despite the utterance including both "Alexa" and "Carja."

The vehicle 110a may include local language processing (LP) components 295. The local LP components 295 may include ASR, NLU, and/or entity resolution similar to their cloud counterparts, but perhaps using smaller models and/or abridged processing. The local LP components 295 are described in additional detail below with reference to FIG. 4.

The vehicle 110a may include a dialog manager component 272. The dialog manager component 272 may associate a dialog session identifier with the dialog upon identifying that the user is engaging in a dialog with the user. The dialog manager component 272 may maintain a state of a dialog including whether a wakeword has been verified and, if so, which CPS 180 or 181 has been activated for the dialog session. The dialog manager component 272 may determine, for example, that subsequent audio received by the vehicle 110a represent an utterance that corresponds to the dialog session identifier. Thus, in some implementations, the vehicle 110a may determine that subsequent audio corresponding to the dialog session identifier may be sent to the CPS 180 or 181 associated with the invoked virtual assistant without encryption. The dialog manager component 272 is described in additional detail below with reference to FIG. 3.

The vehicle 110a may include an encryption engine 234. The encryption engine 234 may include hardware components and/or software modules for generating encryption keys 131 and implementing one or more encryption algorithms to generate encrypted data 121 using the one or more encryption keys 131. In some implementations, the encryption engine 234 may divide the audio data into portions and encrypt each portion with a different encryption key 131a or 131b such that a decryption engine 244 of the system 220 may decrypt the encrypted audio data 121 using the first encryption key 131a to yield audio data having a relatively lower fidelity, and decrypt the encrypted audio data 121 using the first and second encryption keys 131a and 131b to yield audio data having a relatively higher fidelity. Encryption and decryption are described in further detail below with reference to FIGS. 5 and 6.

The vehicle 110a may include a system directed input detector (SDD) 232. The SDD 232 may be configured to determine whether an input to the system (for example speech, a gesture, etc.) is directed to the system or not directed to the system (for example directed to another user, etc.). The SDD 232 may work in conjunction with the wakeword detection component 221 and/or the input detector 223; for example, to verify that the user 5 intends to invoke a particular virtual assistant. The SDD 232 may be configured to determine whether an input to the system (for example speech, a gesture, etc.) is directed to the system or not directed to the system (for example directed to another user, etc.). The SDD 232 may work in conjunction with the wakeword detection component 221 and/or the input detector 223. If the SDD 232 determines an input is directed to the system, the device 110 may "wake" and begin sending captured data for further processing (for example, processing audio data using the LP component 392). If data is being processed the device 110 may indicate such to the user, for example by activating or changing the color of an illuminated output (such as an LED ring), displaying an indicator on a display (such as a light bar across the display), outputting an audio indicator (such as a beep) or otherwise informing a user that input data is being processed. If the SDD 232 determines an input is not directed to the system (such as a speech or gesture directed to another user) the device 110 may discard the data and take no further action for processing purposes. In this way the system 100 may prevent processing of data not directed to the system, thus protecting the users' privacy. As an indicator to the user, however, the system may output an audio, visual, or other indicator when the SDD 232 is determining whether an input is potentially device directed. For example, the system may output an orange indicator while considering an input, and may output a green indicator if a system directed input is detected. Other such configurations are possible. Further details regarding the SDD 232 are included below with regard to FIG. 11. The SDD 232 is discussed in additional detail below with reference to FIG. 11.

The vehicle 110a may include a local command processing subsystem (CPS) 282 capable of performing certain actions on behalf of the user based on intents and entities determined by the local LP components 295 and using one or more local skill components 292a, 292b, and/or 292c (collectively "local skill components 292"). Local skill components 292 may include, for example, a skill for telling the time, a skill for actuating mechanisms of the vehicle 110a such as controlling the windows and/or environmental controls, and/or navigation, etc. The local CPS 282 may correspond to a virtual assistant which may or may not mirror or otherwise represent a virtual assistant corresponding to one of the remote CPSs 180 or 181; for example, the "Carja" virtual assistant may correspond to both the first CPS 180 and the local CPS 282, and one or both of the CPSs may process the audio data and/or perform an action. In some cases, the vehicle may be able to processes speech using the local LP components 295 and perform a requested action using the local CPS 282 and/or a local skill component 292. In such cases, the vehicle 110a may not send an encryption key 131 to any remote CPS 180 or 181, and may terminate transmission of data to any remote CPS 180 or 181. However, if the vehicle 110a determines that local language processing or skills are not capable of parsing the command and/or performing a requested action, the vehicle 110a may transmit the encryption key 131 to one of the CPSs 180 or 181 such that processing of the audio data and/or execution of the command can fall back to the cloud.

The system 220 may include various components for processing speech, performing actions, and/or generating outputs in the form of synthesized speech. The system 220 may include an orchestrator component 230, which may include memory and logic that enables the orchestrator component 230 to transmit various pieces and forms of data to various components of the system, as well as perform other operations as described herein. The orchestrator is described in further detail below with reference to FIG. 3. The orchestrator component 230 may receive the encrypted audio data 121 from the vehicle 110a and store it until such time as the vehicle 110a provides an encryption key 131. If the orchestrator component 230 does not receive an encryption key 131 within a certain amount of time, or if the orchestrator component 230 receives a message from the vehicle 110a that the encrypted data 121 should not be processed, the orchestrator component 230 may purge the encrypted data 121. If the orchestrator component 230 receives the encryption key 131, the orchestrator component 230 may send the encrypted data 121 and the encryption key 131 to the decryption engine 244. The decryption engine 244 may decrypt the encrypted data 121 using the encryption key 131 to generate audio data. In some implementations, the encrypted data 121 may have been encrypted with more than one encryption key 131 such that decrypting with a first encryption key 131a yields audio data having relatively lower fidelity suitable for human communication while decrypting with the first encryption key 131a and a second encryption key 131b may yield audio data having relatively higher fidelity suitable for ASR. Encryption and decryption is described in additional detail below with reference to FIGS. 5 and 6. The decryption engine 244 may return decrypted audio data to the orchestrator component 230.

The system 220 may include language processing (LP) components 295. The orchestrator component 230 may send the decrypted audio data to the LP components 295 for ASR, NLU, entity resolution, etc. The LP components 295 may return one or more NLU hypotheses corresponding to the audio data. The orchestrator component 230 may send a top ranking NLU hypothesis to the first CPS 180 or the second CPS 181 depending on the virtual assistant invoked by the user 5 as determined via wakeword determination and/or gestures assignment. The CPSs 180 and 181 may include one or more skill components, such as skill components 290a, 290b, and 290c associated with the first CPS 180 (and thus the first virtual assistant); and skill components 291a, 291b, and 291c associated with the second CPS 181 (and thus the second virtual assistant). The skill components 290 and 291 may leverage additional resources such as skill support systems 225a associated with one or more of the skill components 290 and/or skill support systems 225b associated with one or more of the skill components 291a. In some implementations, certain skill components 290 and/or 291 may be shared between different CPSs 180 and 181. Additionally or alternatively, the CPSs 180 and/or 181 may include dedicated LP components 295, language output components 293, and/or decryption engines 244. The CPSs 180 or 181 may perform an action and/or generate a response to the command embodied in the NLU hypothesis, and return an output to the orchestrator component 230. If the output includes a directive such as a command for the vehicle 110a or other device 110 to perform an action in hardware or software, the orchestrator component 230 may send the directive to the designated device 110. If the output includes a response to be delivered in the form of synthesized speech, the orchestrator component 230 may send the output to the language output component 293 for natural language generation (NLG) and/or text-to-speech (TTS). The language output component 293 may return the synthesized speech to the orchestrator component 230 in the form of responsive audio data. The orchestrator component 230 may send the responsive audio data back to the vehicle 110a for output by the speaker 106.

Example operations of the system 100 are described below with reference to FIGS. 7 through 10.

Figure 3:
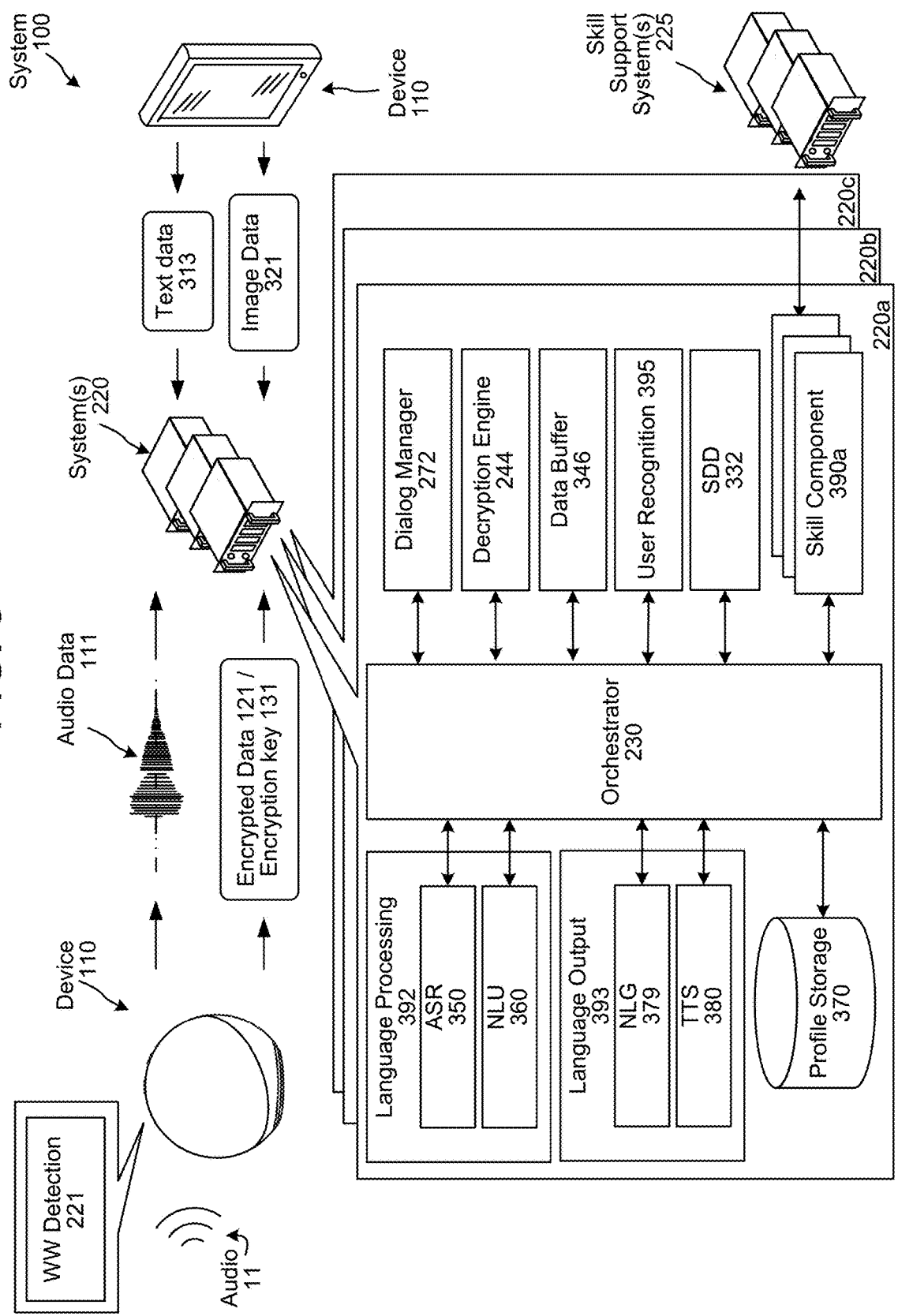
FIG. 3 is a conceptual diagram of components of the system, according to embodiments of the present disclosure.

FIG. 3 is a conceptual diagram of components of the system 100, according to embodiments of the present disclosure. The system 100 may operate using various components as described in FIG. 3. The various components may be located on same or different physical devices. Communication between various components may occur directly or across a network(s) 199. The device 110 may include audio capture component(s), such as a microphone or array of microphones of a device 110, captures audio 11 and creates corresponding audio data 111. Once speech is detected in audio data 111 representing the audio 11, the device 110 may determine if the speech is directed at the device 110/system 220. In at least some embodiments, such determination may be made using a wakeword detection component 221. The wakeword detection component 221 may be configured to detect various wakewords. In at least some examples, each wakeword may correspond to a name of a different digital assistant. An example wakeword/virtual assistant name is "Alexa." In another example, input to the system may be in form of text data 313, for example as a result of a user typing an input into a user interface of device 110. Other input forms may include indication that the user has pressed a physical or virtual button on device 110, the user has made a gesture, etc. The device 110 may also capture images using camera(s) 114 of the device 110 and may send image data 321 representing those image(s) to the system 220. The image data 321 may include raw image data or image data processed by the device 110 before sending to the system 220.

Once input is detected by an input detector and/or a wakeword is detected by the wakeword detection component 221, the device 110 may "wake" and begin transmitting audio data 111 or encrypted data 121, representing the audio 311, to the system(s) 220. The audio data 111 may include data corresponding to the wakeword; in other embodiments, the portion of the audio corresponding to the wakeword may be removed by the device 110 prior to sending the audio data 111 to the system(s) 220. In the case of touch input detection or gesture based input detection, the audio data may not include a wakeword.

In some implementations, the system 100 may include more than one system 220; for example a first system 220a, a second system 220b, and/or a third system 220c. The systems 220 may respond to different wakewords and/or perform different categories of tasks. Each system 220 may be associated with its own wakeword such that speaking a certain wakeword results in audio data be sent to and processed by a particular system. For example, detection of the wakeword "Alexa" by the wakeword detection component 221 may result in sending audio data to system 220a for processing while detection of the wakeword "Computer" by the wakeword detector may result in sending audio data to system 220b for processing. The system may have a separate wakeword and system for different skills/systems (e.g., "Dungeon Master" for a game play skill/system 220c) and/or such skills/systems may be coordinated by one or more skill(s) 390 of one or more systems 220.

Upon receipt by the system(s) 220, the audio data 111 may be sent to an orchestrator component 230. The orchestrator component 230 may include memory and logic that enables the orchestrator component 230 to transmit various pieces and forms of data to various components of the system, as well as perform other operations as described herein. The orchestrator component 230 may store the encrypted data 121 in the data buffer 346. If the orchestrator component 230 receives an encryption key 131 for the encrypted data 121, the orchestrator component 230 may retrieve the encrypted data 121 from the data buffer 346 and send the encrypted data 121 and the encryption key 131 to the decryption engine 244. The decryption engine 244 may generate audio data 311 and return it to the orchestrator component 230. Encryption and decryption are discussed in additional detail below with reference to FIGS. 5 and 6. If, however, the orchestrator component 230 does not receive an encryption key 131 within a certain period of time, or if the orchestrator component 230 receives an indication to close the communications session associated with the encrypted data 121 (e.g., due to wakeword verification determining that the device 110 opened the communications session based on a false wake), the orchestrator component 230 may purge the encrypted data 121; for example, by deleting it or allow it to be overwritten.

In some implementations, the system 220 may include a system directed detector (SDD) 332. The SDD 332 may be similar to the SDD 232, and determine whether a user's attention is directed to the device 110. The determination may provide an additional verification that the user 5 is speaking to the device 110 and wishes the device 110 to transmit audio data 111 of the user's speech 5 to the system 220. The SDD 332 is described in further detail below with reference to FIG. 11.

The orchestrator component 230 may send the audio data 311 to a language processing (LP) component 392. The LP component 392 (sometimes also referred to as a spoken language understanding (SLU) component) includes an automatic speech recognition (ASR) component 350 and a natural language understanding (NLU) component 360. The ASR component 350 may transcribe the audio data 311 into text data. The text data output by the ASR component 350 represents one or more than one (e.g., in the form of an N-best list) ASR hypotheses representing speech represented in the audio data 311. The ASR component 350 interprets the speech in the audio data 311 based on a similarity between the audio data 311 and pre-established language models. For example, the ASR component 350 may compare the audio data 311 with models for sounds (e.g., acoustic units such as phonemes, senons, phones, etc.) and sequences of sounds to identify words that match the sequence of sounds of the speech represented in the audio data 311. The ASR component 350 sends the text data generated thereby to an NLU component 360, via, in some embodiments, the orchestrator component 230. The text data sent from the ASR component 350 to the NLU component 360 may include a single top-scoring ASR hypothesis or may include an N-best list including multiple top-scoring ASR hypotheses. An N-best list may additionally include a respective score associated with each ASR hypothesis represented therein. The ASR component 350 is described in greater detail below with regard to FIG. 12.

The LP component 392 may further include a NLU component 360. The NLU component 360 may receive the text data from the ASR component. The NLU component 360 may attempts to make a semantic interpretation of the phrase(s) or statement(s) represented in the text data input therein by determining one or more meanings associated with the phrase(s) or statement(s) represented in the text data. The NLU component 360 may determine an intent representing an action that a user desires be performed and may determine information that allows a device (e.g., the device 110, the system(s) 220, a skill component 390, a skill system(s) 225, etc.) to execute the intent. For example, if the text data corresponds to "play the 5$^{th}$ Symphony by Beethoven," the NLU component 360 may determine an intent that the system output music and may identify "Beethoven" as an artist/composer and "5th Symphony" as the piece of music to be played. For further example, if the text data corresponds to "what is the weather," the NLU component 360 may determine an intent that the system output weather information associated with a geographic location of the device 110. In another example, if the text data corresponds to "turn off the lights," the NLU component 360 may determine an intent that the system turn off lights associated with the device 110 or the user 5. However, if the NLU component 360 is unable to resolve the entity—for example, because the entity is referred to by anaphora such as "this song" or "my next appointment"—the LP component 392 can send a decode request to another LP component 392 for information regarding the entity mention and/or other context related to the utterance. The LP component 392 may augment, correct, or base results data upon the audio data 311 as well as any data received from the other LP component 392.

The NLU component 360 may return NLU results data 1485/1425 (which may include tagged text data, indicators of intent, etc.) back to the orchestrator component 230. The orchestrator component 230 may forward the NLU results data to a skill component(s) 390. If the NLU results data includes a single NLU hypothesis, the NLU component 360 and the orchestrator component 230 may direct the NLU results data to the skill component(s) 390 associated with the NLU hypothesis. If the NLU results data 1485/1425 includes an N-best list of NLU hypotheses, the NLU component 360 and the orchestrator component 230 may direct the top scoring NLU hypothesis to a skill component(s) 390 associated with the top scoring NLU hypothesis. The system may also include a post-NLU ranker which may incorporate other information to rank potential interpretations determined by the NLU component 360. The local device 110 may also include its own post-NLU ranker, which may operate similarly to the post-NLU ranker.

A skill component may be software running on the system(s) 220 that is akin to a software application. That is, a skill component 390, like the skill components 290, 291, and/or 292 previously described, may enable the system(s) 220 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 220 may be configured with more than one skill component 390. For example, a weather service skill component may enable the system(s) 220 to provide weather information, a car service skill component may enable the system(s) 220 to book a trip with respect to a taxi or ride sharing service, a restaurant skill component may enable the system(s) 220 to order a pi7 with respect to the restaurant's online ordering system, etc. A skill component 390 may operate in conjunction between the system(s) 220 and other devices, such as the device 110, in order to complete certain functions. Inputs to a skill component 390 may come from speech processing interactions or through other interactions or input sources. A skill component 390 may include hardware, software, firmware, or the like that may be dedicated to a particular skill component 390 or shared among different skill components 390.

A skill support system(s) 225 may communicate with a skill component(s) 390 within the system(s) 220 and/or directly with the orchestrator component 230 or with other components. A skill support system(s) 225 may be configured to perform one or more actions. An ability to perform such action(s) may sometimes be referred to as a "skill." That is, a skill may enable a skill support system(s) 225 to execute specific functionality in order to provide data or perform some other action requested by a user. For example, a weather service skill may enable a skill support system(s) 225 to provide weather information to the system(s) 220, a car service skill may enable a skill support system(s) 225 to book a trip with respect to a taxi or ride sharing service, an order pi7 skill may enable a skill support system(s) 225 to order a pi7 with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 220 may be configured with a skill component 390 dedicated to interacting with the skill support system(s) 225. Unless expressly stated otherwise, reference to a skill, skill device, or skill component may include a skill component 390 operated by the system(s) 220 and/or skill operated by the skill support system(s) 225. Moreover, the functionality described herein as a skill or skill may be referred to using many different terms, such as an action, bot, app, or the like. The skill component 390 and or skill support system(s) 225 may return output data to the orchestrator component 230.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 272 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on system configuration the dialog manager component 272 may determine the appropriate system generated response to give to a particular utterance or user input of a turn. Or creation of the system generated response may be managed by another component of the system (e.g., the language output component 393, NLG 379, orchestrator component 230, etc.) while the dialog manager component 272 selects the appropriate responses. Alternatively, another component of the system(s) 220 may select responses using techniques discussed herein. The text of a system generated response may be sent to a TTS component 380 for creation of audio data corresponding to the response. The audio data may then be sent to a user device (e.g., device 110) for ultimate output to the user. Alternatively (or in addition) a dialog response may be returned in text or some other form.

The dialog manager component 272 may receive the ASR hypothesis/hypotheses (i.e., text data) and make a semantic interpretation of the phrase(s) or statement(s) represented therein. That is, the dialog manager component 272 determines one or more meanings associated with the phrase(s) or statement(s) represented in the text data based on words represented in the text data. The dialog manager component 272 determines a goal corresponding to an action that a user desires be performed as well as pieces of the text data that allow a device (e.g., the device 110, the system(s) 220, a skill component 390, a skill system(s) 225, etc.) to execute the intent. If, for example, the text data corresponds to "what is the weather," the dialog manager component 272 may determine that that the system(s) 220 is to output weather information associated with a geographic location of the device 110. In another example, if the text data corresponds to "turn off the lights," the dialog manager component 272 may determine that the system(s) 220 is to turn off lights associated with the device(s) 110 or the user(s) 5.

The dialog manager component 272 may send the results data to one or more skill(s) 390. If the results data includes a single hypothesis, the orchestrator component 230 may send the results data to the skill(s) 390 associated with the hypothesis. If the results data includes an N-best list of hypotheses, the orchestrator component 230 may send the top scoring hypothesis to a skill(s) 390 associated with the top scoring hypothesis.

The system 220 includes a language output component 393. The language output component 393 includes a natural language generation (NLG) component 379 and a text-to-speech (TTS) component 380. The NLG component 379 can generate text for purposes of TTS output to a user. For example the NLG component 379 may generate text corresponding to instructions corresponding to a particular action for the user to perform. The NLG component 379 may generate appropriate text for various outputs as described herein. The NLG component 379 may include one or more trained models configured to output text appropriate for a particular input. The text output by the NLG component 379 may become input for the TTS component 380 (e.g., output text data discussed below). Alternatively or in addition, the TTS component 380 may receive text data from a skill component 390 or other system component for output.

The NLG component 379 may include a trained model. The NLG component 379 generates output text data from dialog data received by the dialog manager component 272 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech (TTS) component 380.

The TTS component 380 may generate audio data (e.g., synthesized speech) from text data using one or more different methods. Text data input to the TTS component 380 may come from a skill component 390, the orchestrator component 230, or another component of the system. In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 220 as image data. The device 110 may further include circuitry for voice command-based control of the camera, allowing a user 5 to request capture of image or video data. The device 110 may process the commands locally or send audio data 311 representing the commands to the system(s) 220 for processing, after which the system(s) 220 may return output data that can cause the device 110 to engage its camera.

The system(s) 220 may include a user recognition component 395 that recognizes one or more users using a variety of data. However, the disclosure is not limited thereto, and the device 110 may include a user recognition component 495 instead of and/or in addition to user recognition component 395 of the system(s) 220 without departing from the disclosure. User recognition component 495 operates similarly to user recognition component 395.

The user-recognition component 395 may take as input the audio data 311 and/or text data output by the ASR component 350. The user-recognition component 395 may perform user recognition by comparing audio characteristics in the audio data 311 to stored audio characteristics of users. The user-recognition component 395 may also perform user recognition by comparing biometric data (e.g., fingerprint data, iris data, etc.), received by the system in correlation with the present user input, to stored biometric data of users assuming user permission and previous authorization. The user-recognition component 395 may further perform user recognition by comparing image data (e.g., including a representation of at least a feature of a user), received by the system in correlation with the present user input, with stored image data including representations of features of different users. The user-recognition component 395 may perform additional user recognition processes, including those known in the art.

The user-recognition component 395 determines scores indicating whether user input originated from a particular user. For example, a first score may indicate a likelihood that the user input originated from a first user, a second score may indicate a likelihood that the user input originated from a second user, etc. The user-recognition component 395 also determines an overall confidence regarding the accuracy of user recognition operations.

Output of the user-recognition component 395 may include a single user identifier corresponding to the most likely user that originated the user input. Alternatively, output of the user-recognition component 395 may include an N-best list of user identifiers with respective scores indicating likelihoods of respective users originating the user input. The output of the user-recognition component 395 may be used to inform NLU processing as well as processing performed by other components of the system.

The system 100 (either on device 110, system 220, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 370 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 220 with permission to allow the skill to execute with respect to the user's natural language user inputs. If a user does not enable a skill, the system 220 may not invoke the skill to execute with respect to the user's natural language user inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 370 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 4:
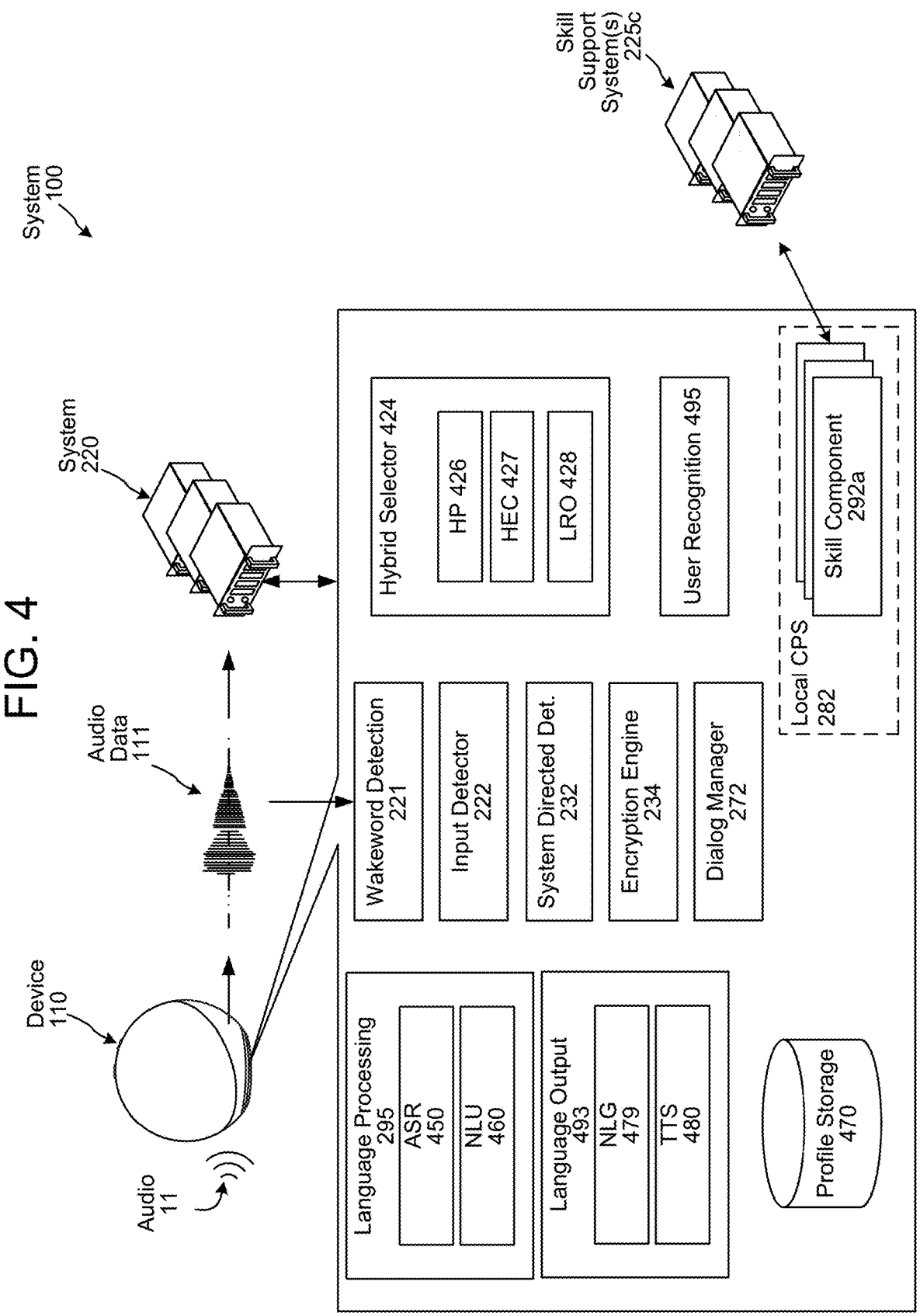
FIG. 4 is a conceptual diagram illustrating components that may be included in a device, according to embodiments of the present disclosure.

FIG. 4 is a conceptual diagram illustrating components that may be included in a device 110, according to embodiments of the present disclosure. Although the components of FIG. 3 may be illustrated as part of system(s) 220, device 110, or otherwise, the components may be arranged in other device(s) (such as in device 110 if illustrated in system(s) 220 or vice-versa, or in other device(s) altogether) without departing from the disclosure. FIG. 4 illustrates such a configured device 110.

The device 110 may include the wakeword detection component 221, input detector 223, SDD 232, dialog manager component 272, local LP components 295, local CPS 282, and/or local skill components 292 as previously described.

In at least some embodiments, the system 220 may receive encrypted audio data 121 from the device 110, to recognize speech corresponding to a spoken input in the received audio data 111, and to perform functions in response to the recognized speech. In at least some embodiments, these functions involve sending directives (e.g., commands), from the system 220 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 220 over the network(s) 199, some or all of the functions capable of being performed by the system 220 may be performed by sending one or more directives over the network(s) 199 to the device 110, which, in turn, may process the directive(s) and perform one or more corresponding actions. For example, the system 220, using a remote directive that is included in response data (e.g., a remote response), may instruct the device 110 to output an audible response (e.g., using TTS processing performed by an on-device TTS component 480) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 220 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

The device 110 may conduct its own speech processing using on-device language processing components, such as an SLU/LP component 295 (which may include an ASR component 450 and an NLU component 460), similar to the manner discussed herein with respect to the LP component 392 (or ASR component 350 and the NLU component 360) of the system 220. LP component 295 may operate similarly to LP component 392, ASR component 450 may operate similarly to ASR component 350 and NLU component 460 may operate similarly to NLU component 360. The device 110 may also internally include, or otherwise have access to, other components such as one or more skill components 292 capable of executing commands based on NLU output data or other results determined by the device 110/system 220 (which may operate similarly to skill components 390), a user recognition component 495 (configured to process in a similar manner to that discussed herein with respect to the user recognition component 395 of the system 220), profile storage 470 (configured to store similar profile data to that discussed herein with respect to the profile storage 370 of the system 220), or other components. In at least some embodiments, the profile storage 470 may only store profile data for a user or group of users specifically associated with the device 110. Similar to as described above with respect to skill component 390, a skill component 292 may communicate with a skill system(s) 225*c*. The device 110 may also have its own language output component 493 which may include NLG component 479 and TTS component 480. Language output component 493 may operate similarly to language output component 393, NLG component 479 may operate similarly to NLG component 379 and TTS component 480 may operate similarly to TTS component 380.

In at least some embodiments, the on-device language processing components may not have the same capabilities as the language processing components of the system 220. For example, the on-device language processing components may be configured to handle only a subset of the natural language user inputs that may be handled by the system 220. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 220. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 220.

The hybrid selector 424, of the device 110, may include a hybrid proxy (HP) 426 configured to proxy traffic to/from the system 220. For example, the HP 426 may be configured to send messages to/from a hybrid execution controller (HEC) 427 of the hybrid selector 424. For example, command/directive data received from the system 220 can be sent to the HEC 427 using the HP 426. The HP 426 may also be configured to allow the audio data 311 to pass to the system 220 while also receiving (e.g., intercepting) this audio data 311 and sending the audio data 311 to the HEC 427.

In at least some embodiments, the hybrid selector 424 may further include a local request orchestrator (LRO) 428 configured to notify the ASR component 450 about the availability of new audio data 311 that represents user speech, and to otherwise initiate the operations of local language processing when new audio data 311 becomes available. In general, the hybrid selector 424 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 220 and chooses to use that remotely-determined directive data.

Thus, when the audio data 311 is received, the HP 426 may allow the audio data 311 to pass through to the system 220 and the HP 426 may also input the audio data 311 to the on-device ASR component 450 by routing the audio data 311 through the HEC 427 of the hybrid selector 424, whereby the LRO 428 notifies the ASR component 450 of the audio data 311. At this point, the hybrid selector 424 may wait for response data from either or both of the system 220 or the local language processing components. However, the disclosure is not limited thereto, and in some examples the hybrid selector 424 may send the audio data 311 only to the local ASR component 450 without departing from the disclosure. For example, the device 110 may process the audio data 311 locally without sending the audio data 311 to the system 220.

The local ASR component 450 is configured to receive the audio data 311 from the hybrid selector 424, and to recognize speech in the audio data 311, and the local NLU component 460 is configured to determine a user intent from the recognized speech, and to determine how to act on the user intent by generating NLU output data which may include directive data (e.g., instructing a component to perform an action). Such NLU output data may take a form similar to that as determined by the NLU component 360 of the system 220. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 460) may be selected as usable to respond to a natural language user input, and local response data may be sent (e.g., local NLU output data, local knowledge base information, internet search results, and/or local directive data) to the hybrid selector 424, such as a "ReadyToExecute" response. The hybrid selector 424 may then determine whether to use directive data from the on-device components to respond to the natural language user input, to use directive data received from the system 220, assuming a remote response is even received (e.g., when the device 110 is able to access the system 220 over the network(s) 199), or to determine output audio requesting additional information from the user 5.

The device 110 and/or the system 220 may associate a unique identifier with each natural language user input. The device 110 may include the unique identifier when sending the audio data 311 to the system 220, and the response data from the system 220 may include the unique identifier to identify which natural language user input the response data corresponds.

In at least some embodiments, the device 110 may include, or be configured to use, one or more skill components 292 that may work similarly to the skill component(s) 390 implemented by the system 220. The skill component(s) 292 may correspond to one or more domains that are used in order to determine how to act on a spoken input in a particular way, such as by outputting a directive that corresponds to the determined intent, and which can be processed to implement the desired operation. The skill component(s) 292 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill support systems 225c. For example, a skill support system 225c may be located in a remote environment (e.g., separate location) such that the device 110 may only communicate with the skill support system 225c via the network(s) 199. However, the disclosure is not limited thereto. For example, in at least some embodiments, a skill support system 225c may be configured in a local environment (e.g., home server and/or the like) such that the device 110 may communicate with the skill support system 225c via a private network, such as a local area network (LAN).

As used herein, a "skill" may refer to a skill component 292, a skill support system 225c, or a combination of a skill component 292 and a corresponding skill support system 225c. Similar to the manner discussed with regard to FIG. 3, the local device 110 may be configured to recognize multiple different wakewords and/or perform different categories of tasks depending on the wakeword. Such different wakewords may invoke different processing components of local device 110 (not illustrated in FIG. 4). For example, detection of the wakeword "Alexa" by the wakeword detection component 221 may result in sending audio data to certain LP components 295/skill components 292 for processing while detection of the wakeword "Computer" by the wakeword detector may result in sending audio data to different LP components 295/skill components 292 for processing.

Figure 5:
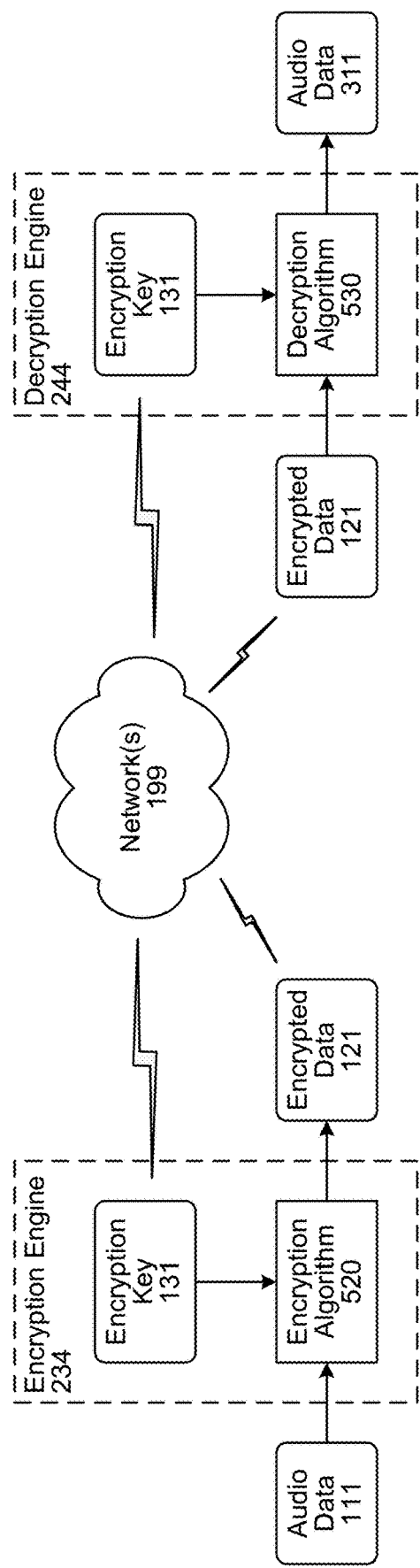
FIG. 5 is a block diagram illustrating audio data encryption for audio protection in a multi-assistant system, according to embodiments of the present disclosure.

FIG. 5 is a block diagram illustrating audio data encryption for audio protection in a multi-assistant system 100, according to embodiments of the present disclosure. While FIG. 5 describes operations for encrypting audio data and providing an encryption key to a receiving system, the same components and operations may be applicable to various other forms of data in addition to or instead of audio data. An encryption engine 234 of a device 110 may receive audio data 111. The encryption engine 234 may generate one or more encryption keys 131. The encryption engine 234 may execute an encryption algorithm 520 to generate encrypted data 121 based on the audio data 111 and the encryption key 131. The encryption engine 234 may perform any type of encryption including symmetric encryption and/or asymmetric encryption using private and/or public encryption keys. In the case of symmetric encryption, the same encryption key may be used to both encrypt decrypt data. In asymmetric encryption, however, the encryption key and decryption key may be different. For the sake of simplicity herein, "encryption key 131" is used to describe both the key used to encrypt data as well as the key used to decrypt the data, even if the keys are different. In some implementations, the encryption engine 234 may encrypt the audio data 111 using private key encryption and then provide the encryption key using public key encryption. The encryption engine 234 may variously use Triple Data Encryption Standard (3DES), Twofish, Rivest-Shamir-Adleman (RSA), Pretty Good Privacy (PGP), Advanced Encryption Standard (AES), or others. The device 110 may transmit the encrypted data 121 to the system 220 via a computer network 199.

In some implementations, the encryption engine 234 may use a private key encryption algorithm in which the encryption engine 234 generates its own private encryption key 131 to encrypt the audio data 111. In some implementations, the device 110 may transmit the encryption key 131 to the remote system 220 via public key encryption based on a public encryption key received from the remote system 220. In some implementations, the encrypted data 121, encryption key 131, and/or other data transmitted between the device 110 and remote system 220 may be subject to additional encryption according to protocols for information sharing between the device 110 and the system 220.

The decryption engine 244 may receive the encrypted data 121 and the encryption key 131, if provided by the device 110. The decryption engine 244 may execute a decryption algorithm 530 to generate decrypted audio data 311 based on the encrypted data 121 and the encryption key 131. The decryption engine 244 may send the decrypted audio data 311 to the orchestrator component 230 and/or other components of the system 220 and/or a CPS 180 or 181.

Figure 6:
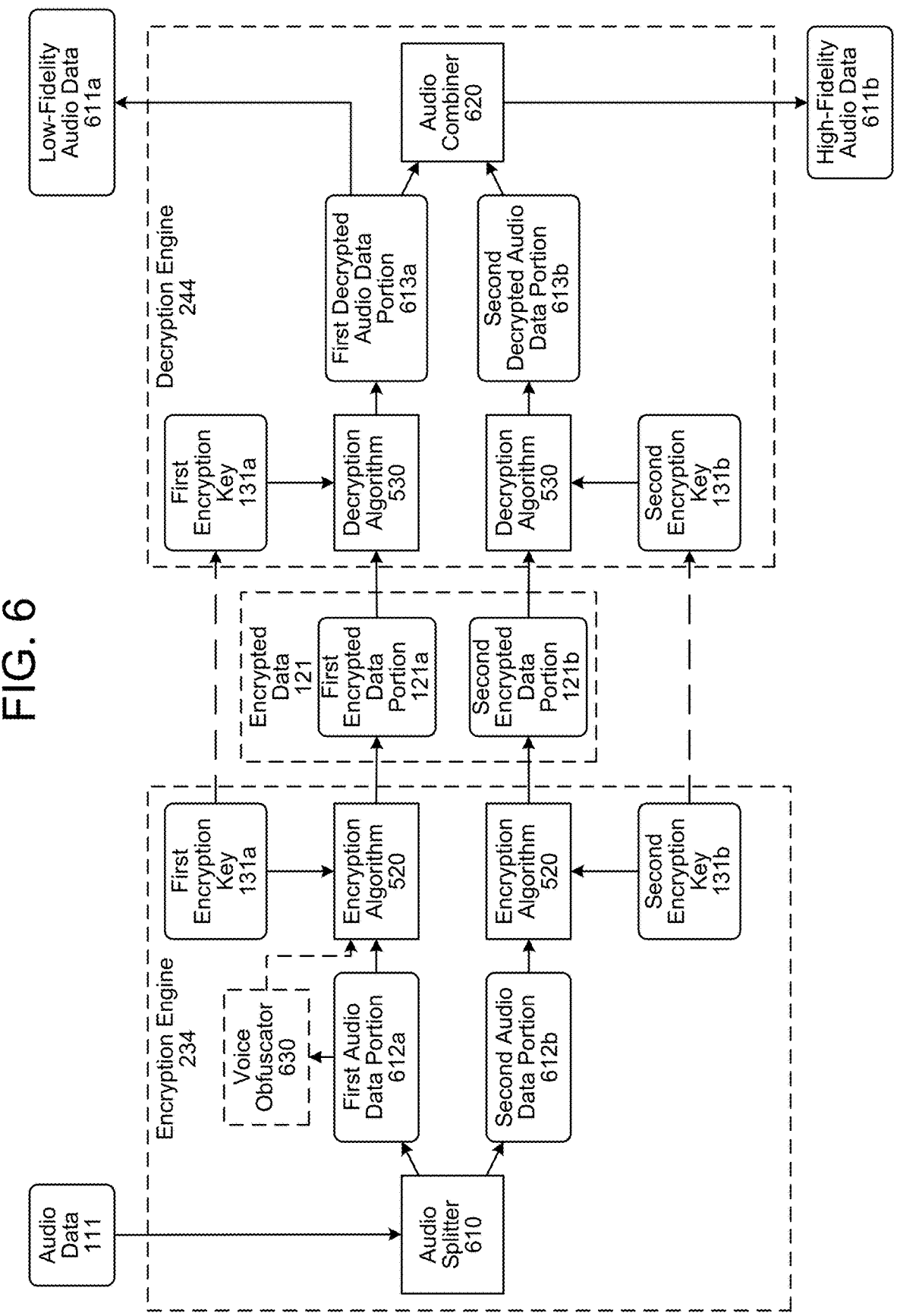
FIG. 6 is a block diagram illustrating audio data encryption allowing for decryption at different levels of fidelity, according to embodiments of the present disclosure.

In some implementations, the system 100 may transmit encrypted audio data 121 in a form that may be decrypted into audio data having different levels of relative fidelity to the original audio based on the encryption key(s) used. FIG. 6 describes how the audio data 111 may be split and separately encrypted such that the encrypted data 121 may be decrypted with different encryption keys to yield audio data 311 having different levels of fidelity. The encryption engine 234 may receive the audio data 111 and use an audio splitter 610 to split the audio data 111 into a first audio data portion 612a and a second audio data portion 612b. The audio splitter 610 may be include logic or software capable of splitting the audio in the time domain and/or the frequency domain. While FIG. 6 describes operations for encrypting audio data, the same components and operations may be applicable to various other forms of data in addition to or instead of audio data; for example, image data may be portioned and encrypted in a similar manner.

For example, time-domain portioning may include using the audio splitter 610 to split a series of audio sample into, for example, a first portion that includes odd number samples and a second portion that includes even number samples. The resulting audio data portions 612 may represent the original audio signal but with half the sample rate and a corresponding reduction in bandwidth. For example, the audio data 111 may have a sample rate of 16 KHz and the resulting audio data portions 612 may appear to have a sample rate of 8 KHz; however, the two audio data portions 612 may be recombined (e.g., after encryption and decryption) to recreate an audio signal close or identical to the original 16 KHz audio signal.

Frequency-domain portioning may include converting the audio data 111 into the frequency domain where audio frames of 30 ms or so may be represented by a feature vector in which each value represents an energy measured within a certain frequency band over the 30 ms audio frame duration. The frequency range of the audio data 111 may be, for example, from 50 Hz to 7,000 Hz. The audio splitter 610 may portion the frequency-domain data into a first audio data portion 612a representing frequencies from 300-3,400 Hz and a second audio data portion 612b representing the frequencies above and below the frequencies represented in the first audio data portion 612a; e.g., 50-300 Hz and 3,400-7,000 Hz. The first audio data portion 612a may include information for frequencies normally used for human voice communication. When the audio data portions 612 are recombined (e.g., after encryption and decryption), however, the resulting audio signal may be close or identical to the full bandwidth of the original audio data 111. These frequency ranges are provided as examples and may be varied or adjusted without departing from the scope of the invention.

Following portioning, the device 110 may send encrypted data 121 (e.g., consisting of the first encrypted data portion 121a and/or the second encrypted data portion 121b) to the system 220. Subsequent wakeword verification may result in the device 110 determining to send the first encryption key 131a to the system 220 to allow the system 220 to process the encrypted data 121. The decryption engine 244 may receive the encrypted data 121 and the first encryption key 131a. A decryption algorithm 530 executed by the decryption engine 244 may decrypt the first encrypted data portion 121a using the first encryption key 131a to yield first decrypted audio data portion 613a. The first decrypted audio data portion 613a may, by itself, represent low-fidelity audio data 611a that may nevertheless be sufficient for human communication via; e.g., voice memo, voice mail, and/or real-time audio communication. In some implementations, the device 110 may send one or both encryption key to the first CPS 180; for example, without waiting for an explicit request for the second encryption key. Whether the device 110 sends one or both encryption keys may depend on which virtual assistant is invoked; for example, if the first virtual assistant is invoked, the vehicle 110a may send both encryption keys 131a and 131b, while if the second virtual assistant is invoked, the vehicle 110a may send only the first encryption key unless it receives a request for the second encryption key 131b.

For speech processing, however, higher fidelity audio may provide higher ASR accuracy that the lower fidelity audio. The system 220 may send back to the device 110 a request for an encryption key 131 capable of decrypting the audio in its original quality. The device 110 may send to the system the second encryption key 131b. The decryption engine 244 may apply the decryption algorithm 530 to decrypt the second encrypted data portion 121b using the second encryption key 131b to yield a second decrypted audio data portion 613b. An audio combiner 620 may combine the decrypted audio data portions 613a and 613b in the time domain or frequency domain to generate high-fidelity audio data 611b.

In some implementations, the audio splitter 610 can generate n audio data portions 612a through 612n, each corresponding to a different encryption key 131a through 131n. The device 110 may provide any number of the encryption keys 131a-131n to allow the decryption engine 244 to decrypt and combine the decrypted audio data portions 613 to recreate an audio signal having various levels of fidelity. The audio data portions 612 need not be the same size (e.g., include the same amount of data). For example, the audio splitter 610 may generate a first audio data portion 612a including audio data having a 128 kbps bit rate, a second audio data portion 612b including audio data having a 64 kbps bit rate, a third audio data portion 612c including audio data having a 32 kbps bit rate, etc.

In some implementations, the device 110 may include a voice obfuscator 630. The device 110 may use the voice obfuscator 630 to alter the first audio data portion 612a (or, in some cases, both audio data portions 612) so as to obscure an identity of the speaker without rendering the voice intelligible. The voice obfuscator 630 may modify one or more features of the audio data portion 612a including amplitude, pitch, timbre, and/or tone, or introduce various types of distortion, noise, and/or interference into the audio data portion 612a. The voice obfuscator 630 may thus obscure a gender, age, accent, etc. of the user 5. The voice obfuscator 630 may therefore act as an anonymizer to allow the device 110 to enhance user 5 privacy by sharing an utterance without divulging the identity of the user 5. The encryption engine 234 may encrypt the altered audio data portion using the encryption algorithm 520. In some implementations, the encryption engine 234 may encrypt both altered and unaltered audio data, such that data representing the altered voice may be decrypted with a first encryption key and data representing the unaltered voice may be decrypted with a second encryption key.

Example operations of encrypting and decrypting audio data at different quality levels are described further below with reference to FIG. 9.

Figure 7:
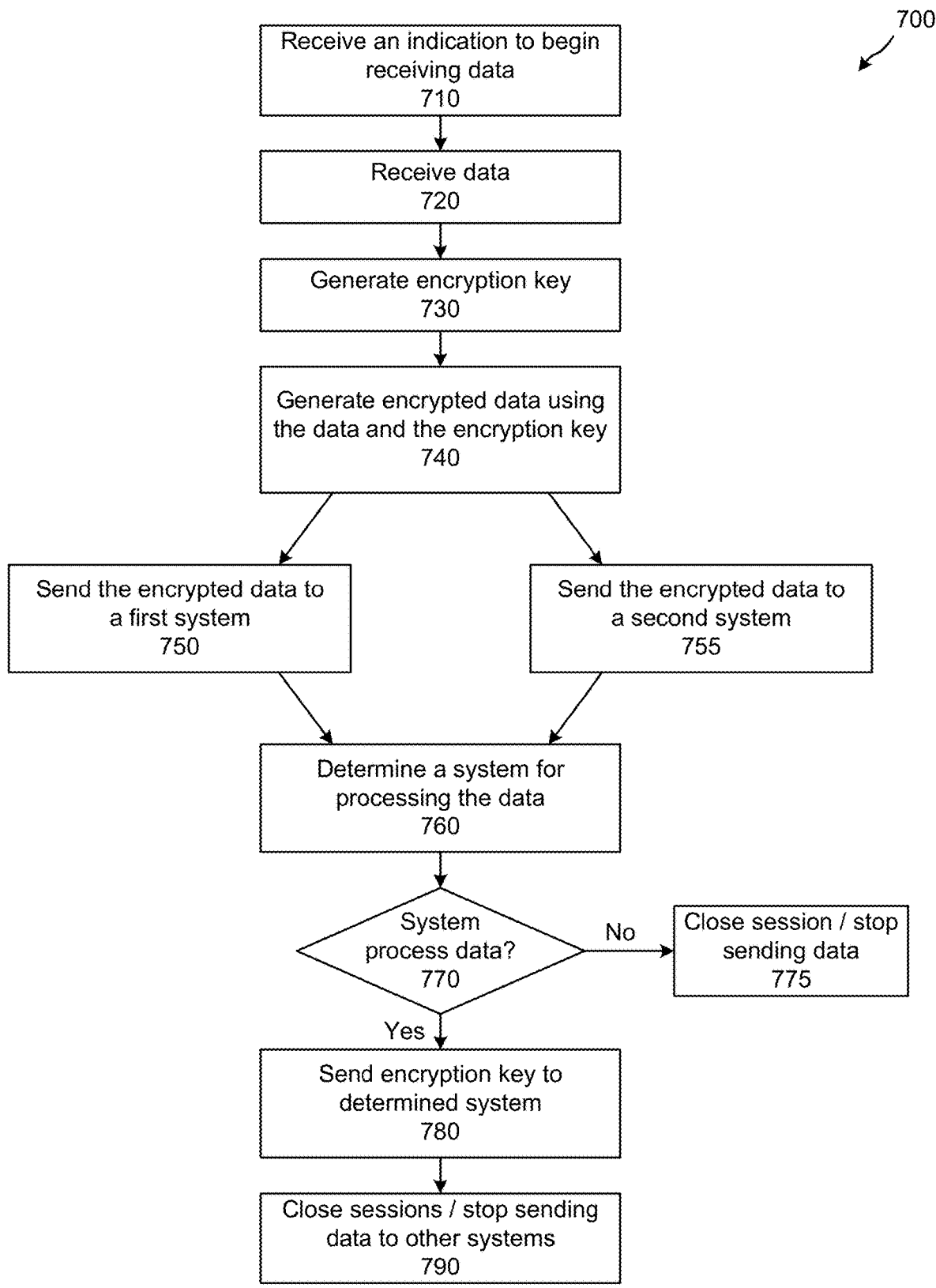
FIG. 7 is a flowchart illustrating example operations of a method of data protection in a multi-assistant system, according to embodiments of the present disclosure.

FIG. 7 is a flowchart illustrating example operations of a method 700 of data protection in a multi-assistant system 100, according to embodiments of the present disclosure. The method 700 may be performed on various components of the system 100 including one or more devices 110 and/or systems 220. The method 700 may include receiving (stage 710) an indication to being receiving data for protected transmission to a first system and a second system. The data may include, for example, audio for speech processing, still images and/or video for computer vision processing including optical character recognition, usage data, sensor data from one or more sensors of the device, etc. The method 700 may include receiving (stage 720) the data; for example, by generating audio data based on audio captured by a microphone of the device 110, still images and/or video based on imaged captured by a camera of the device 110, sensor data received by one or more sensors of the device 110, image data representing content currently displayed on the device, usage data stored o or currently being generated by the device 110, data regarding signals received by an antenna of the device (e.g., representing nearby devices and/or users), etc. The method 700 may include generating (stage 730) an encryption key. The method 700 may include generating (stage 740) encrypted data using the data and the encryption key. Example operations of encryption (and decryption) are described herein with reference to FIGS. 5 and 6.

The method 700 may include the device 110 sending (stage 750) the encrypted data to a first system and sending (stage 755) the encrypted data to a second system. The method 700 may include determining (stage 760) whether one or more of the first system and/or the second system should process the data. For example, for an utterance, the device may perform wakeword detection and/or wakeword verification. The device may determine whether the input was system-directed; e.g., based on features of audio data and/or image data received by the device. The device may receive login credentials corresponding to one of the systems, etc. The method 700 may include determining (decision block 770) whether one of the systems should process the data. If the device determines that neither system should process the data ("No" at the decision block 770), the device 110 may close (stage 775) the communications sessions by, for example, sending a directive to the systems to close communications sessions associated with the encrypted data, terminating transmission of any further data related to the received audio data, and/or terminating the capture of further data by the device 110 until a subsequent activation.

If the device 110 determines that one of the systems is to process the data ("Yes" at the decision block 770), for example the first system, the device 110 may send (stage 780) the encryption key generated at the stage 730 to the corresponding system. In some implementations, the device 110 may close (stage 790) a communications session with the other system by, for example, sending a directive to the other system to close communications session associated with the encrypted data and/or terminating transmission of any further data related to the received data to the other system.

Figure 8:
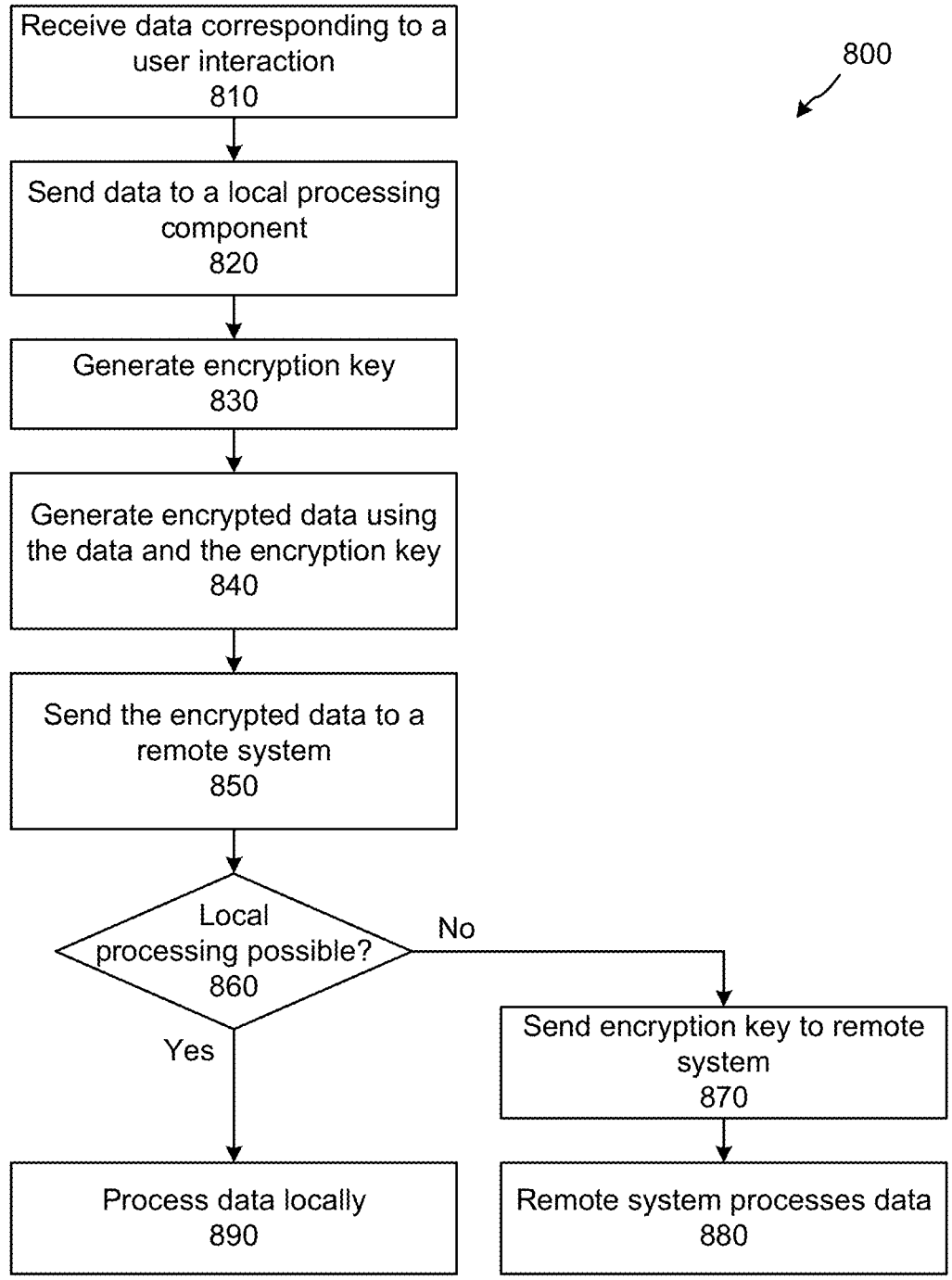
FIG. 8 is a flowchart illustrating example operations of a method of data protection in a multi-assistant system with on-device processing and remote system fallback, according to embodiments of the present disclosure.

FIG. 8 is a flowchart illustrating example operations of a method 800 of data protection in a multi-assistant system with on-device processing and remote system fallback, according to embodiments of the present disclosure. The method 800 may be performed on various components of the system 100 including one or more devices 110 and/or systems 220. The method 800 may include receiving (stage 810) data corresponding to a user interaction (e.g., capturing audio representing a spoken command, capturing an image using a camera of the device, or receiving any other data for processing for or on behalf of a user. The method 800 may include sending (stage 820) the data to a local component for processing (e.g., the LP components 295). The method 800 may include generating (stage 830) an encryption key. The method 800 may include generating (stage 840) encrypted data using the data and the encryption key. Example operations of encryption (and decryption) are described herein with reference to FIGS. 5 and 6. The method 800 may include sending (stage 850) the encrypted data to a remote system.

The method 800 may include determining (decision block 860) whether the device 110 may process the data on-device; for example, whether the device 110 has hardware/software capable of processing the data and/or performing a requested operation. In some cases, local processing may not be possible ("No" at the decision block 860), perhaps because the data represents speech that cannot be processed locally to determine an intent and/or entity, or the intent is associated with a skill not present on, or directly accessible by, the device 110. If local execution is not possible ("No" at the decision block 860), the method 800 may include sending (stage 870) the encryption key generated at the stage 830 to the remote system. The method 800 may include processing (stage 880) the data; for example, by decrypting the encrypted data using the encryption key and processing and/or performing an action responsive to the data. If, however, local processing is possible ("Yes" at the decision block 860), the method 800 may include processing (stage 890) the data locally; for example, using local language/image/data processing components and/or skills.

Figure 9:
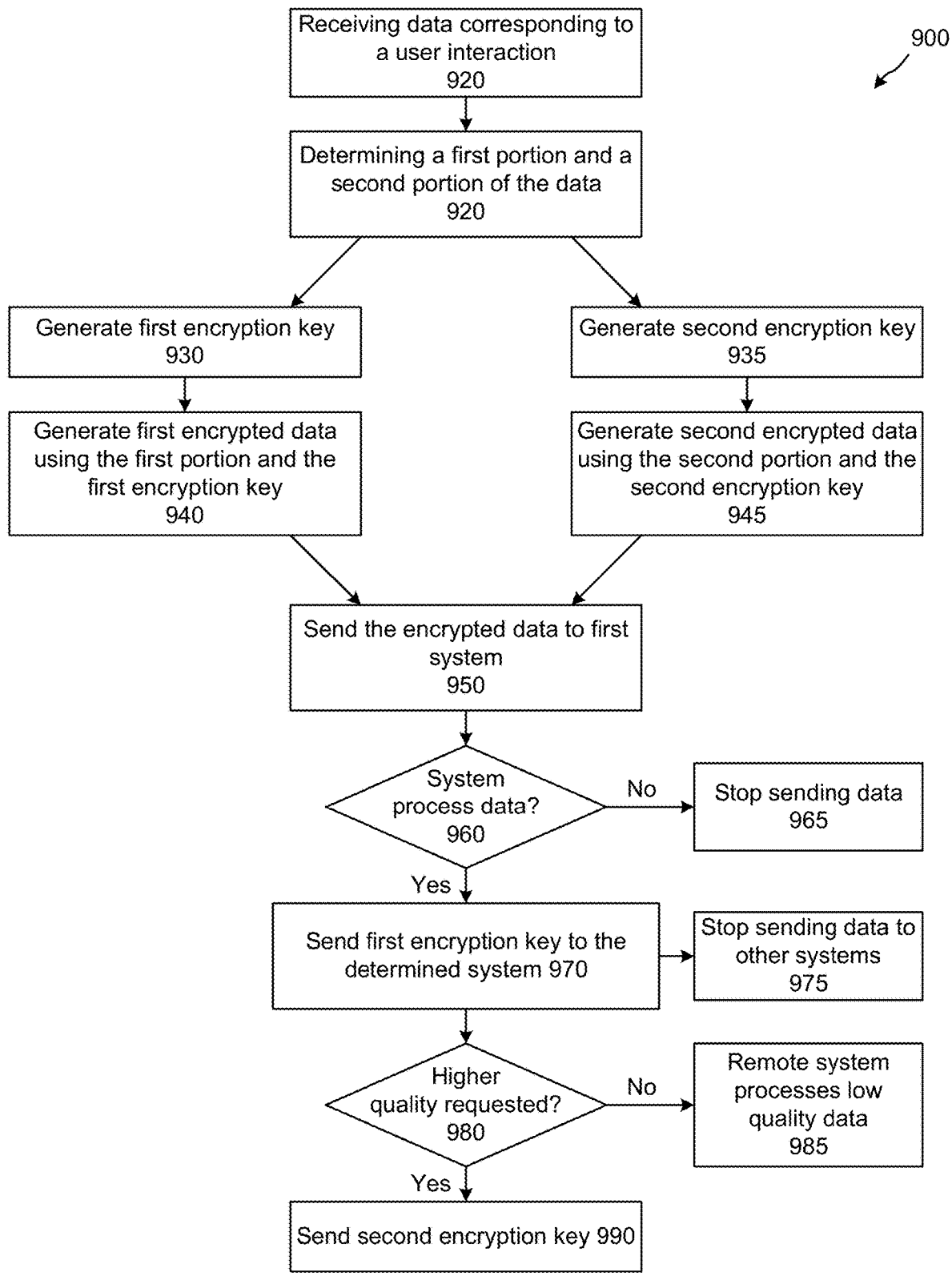
FIG. 9 is a flowchart illustrating example operations of a method of data protection allowing for decryption at different levels of quality, according to embodiments of the present disclosure.

FIG. 9 is a flowchart illustrating example operations of a method of data protection allowing for decryption at different levels of quality, according to embodiments of the present disclosure. The method 900 may be performed on various components of the system 100 including one or more devices 110 and/or systems 220. The method 900 may include receiving (stage 920) data corresponding to a user interaction. The method 900 may include determining (stage 920) a first portion and a second portion of the data; e.g., by splitting the data. For example, in the case of audio data, the device 110 may split the audio data in the time domain or the frequency domain, as described herein with reference to FIG. 6. The method 900 may include generating (stage 930) a first encryption key and generating (stage 935) a second encryption key. The method 900 may include generating (stage 940) first encrypted data using the first portion and the first encryption key, and generating (stage 945) second encrypted data using the second portion and the second encryption key. In some implementations, the method 900 may generation n data portions, each corresponding to a different encryption key. The n data portions may be the same size or different sizes (e.g., the same bit rate or different bit rates). The device 110 may provide any number of the encryption keys to the system 220 to allow the decryption engine to decrypt and combine the decrypted data portions to recreate an audio signal having various levels of quality. The method 900 may include sending (stage 950) the encrypted data to a first system. (In some implementations, the method 900 may additionally include sending the encrypted data to other systems as well.) The method 900 may include determining (decision block 960) whether the one or more remote systems are to process the data. If the device 110 determines that no system is to process the data ("No" at the decision block 960), the method 900 may include closing the communications session with the system and terminating (stage 965) transmission of any remaining data corresponding to the received data. If the device 110 determines that a system is to process the data ("Yes" at the decision block 960), the method 900 may include sending (stage 970) the first encryption key to the determined system. In some implementations, the method 900 may include closing communications sessions with other systems, and terminating (stage 975) transmission of any remaining data.

The system receiving the encryption key may decrypt encrypted data and attempt to process the decrypted data. In some cases, the system may request access to higher quality data. The method 900 may include determining (decision block 980) whether higher quality data has been requested. If higher quality data has not been requested ("No" at the decision block 980), no additional encryption key is sent to the remote system, and the remote system may process (stage 985) the lower quality data. If higher quality data is requested by the remote system ("Yes" at the decision block 980), the method 900 may include sending (stage 990) the second encryption key to the remote system. The remote system may thus decrypt both portions of the encrypted data using the encryption keys to yield the higher quality data. The remote system may process the data and/or perform any requested actions.

Figure 10:
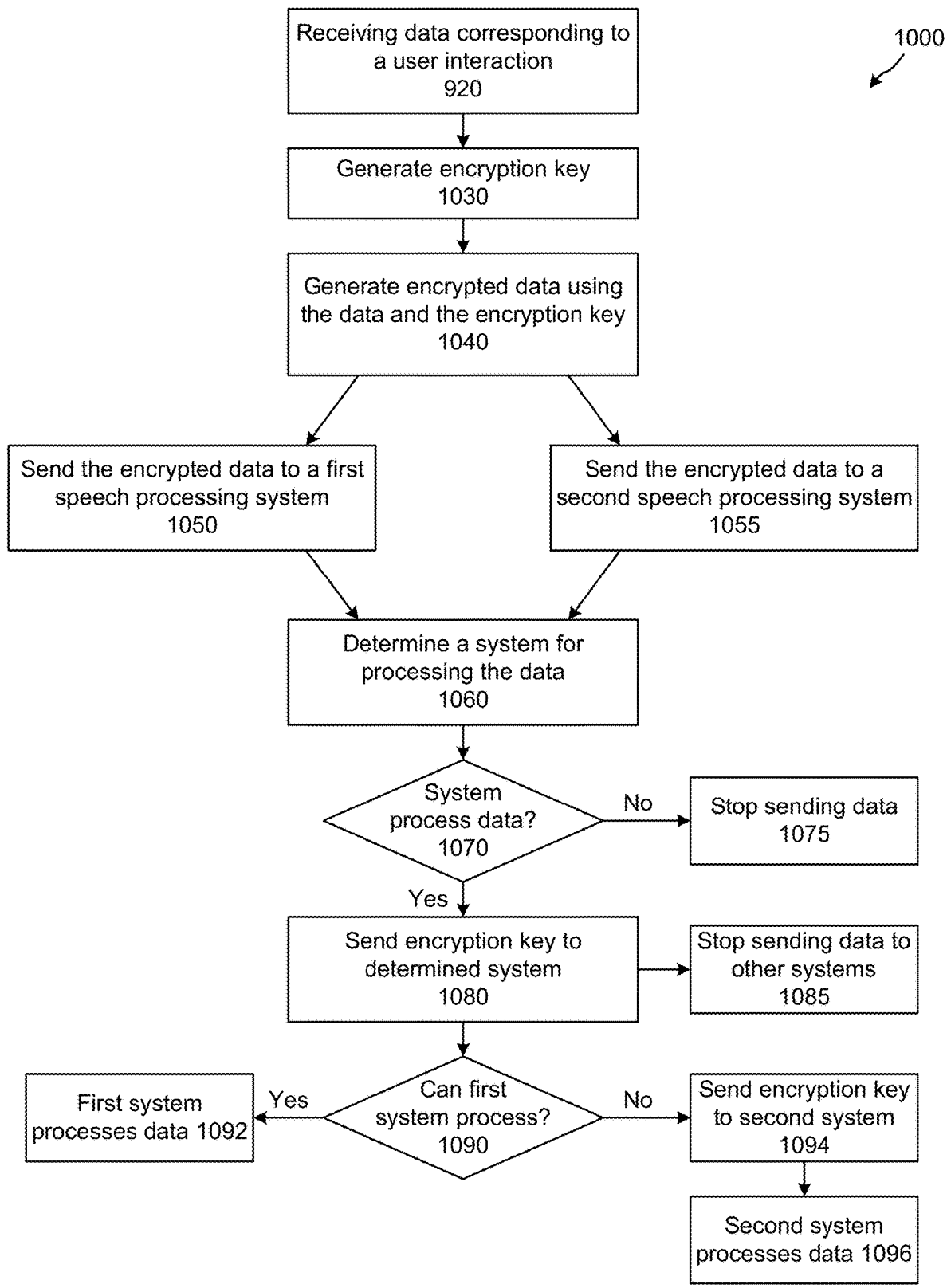
FIG. 10 is a flowchart illustrating example operations of a method of data protection in a multi-assistant system where processing falls back to a second system, according to embodiments of the present disclosure.

FIG. 10 is a flowchart illustrating example operations of a method of data protection in a multi-assistant system where processing falls back to a second system, according to embodiments of the present disclosure. The method 1000 may be performed on various components of the system 100 including one or more devices 110 and/or systems 220. The method 1000 may include receiving (stage 1020) data corresponding to a user interaction. The method 1000 may include generating (stage 1030) an encryption key. The method 1000 may include generating (stage 1040) encrypted data using the data and the encryption key. Example operations of encryption (and decryption) are described herein with reference to FIGS. 5 and 6. The method 1000 may include sending (stage 1050) the encrypted data to a first system and sending (stage 1055) the encrypted data to a second system.

The method 1000 may include determining (stage 1060) component system for processing the data. The method 1000 may include determining (decision block 1070) whether a system has been identified for processing the data. If the device 110 determines that no system should process the data, ("No" at the decision block 1070), the device 110 may close (stage 1075) communications sessions with the system(s) by, for example, terminating transmission of the encrypted data to the system(s), sending a directive to the system(s) to close the communications session(s), and/or terminating capture of further audio. If the device 110 determines that a system should process the data ("Yes" at the decision block 1070), the device 110 may send (stage 1080) the encryption key generated at the stage 1030 to the determined system. In some implementations, the device 110 may close (stage 1085) communications sessions with the other system(s) by, for example, terminating transmission of any remaining data to the second speech processing system (as well as any other speech processing systems to which the device 110 has sent encrypted data) and/or sending directives to the systems to close associated communications sessions.

In some cases, the first system may not be able to process the data and/or perform an action responsive to the data. This could be due to the user mistakenly invoking the wrong assistant, because the first system cannot process a language/dialect/accent of speech used, because the first system cannot execute with respect to a domain/intent/entity represented in the audio data, and/or some other reason. The method 1000 may therefore include determining (decision block 1090) whether the first speech processing system can process the data and/or handle a command represented therein. If the first system can process the data ("Yes" at the decision block 1090), the method 1000 may include processing (stage 1092) the data and/or executing a command by the first system. However, if the first system cannot process the data ("No" at the decision block 1090), the method 1000 may include falling back to the second system by sending (stage 1094) the encryption key to the second system so the second system may decrypt and process (stage 1096) the encrypted data already received.

Figure 11:
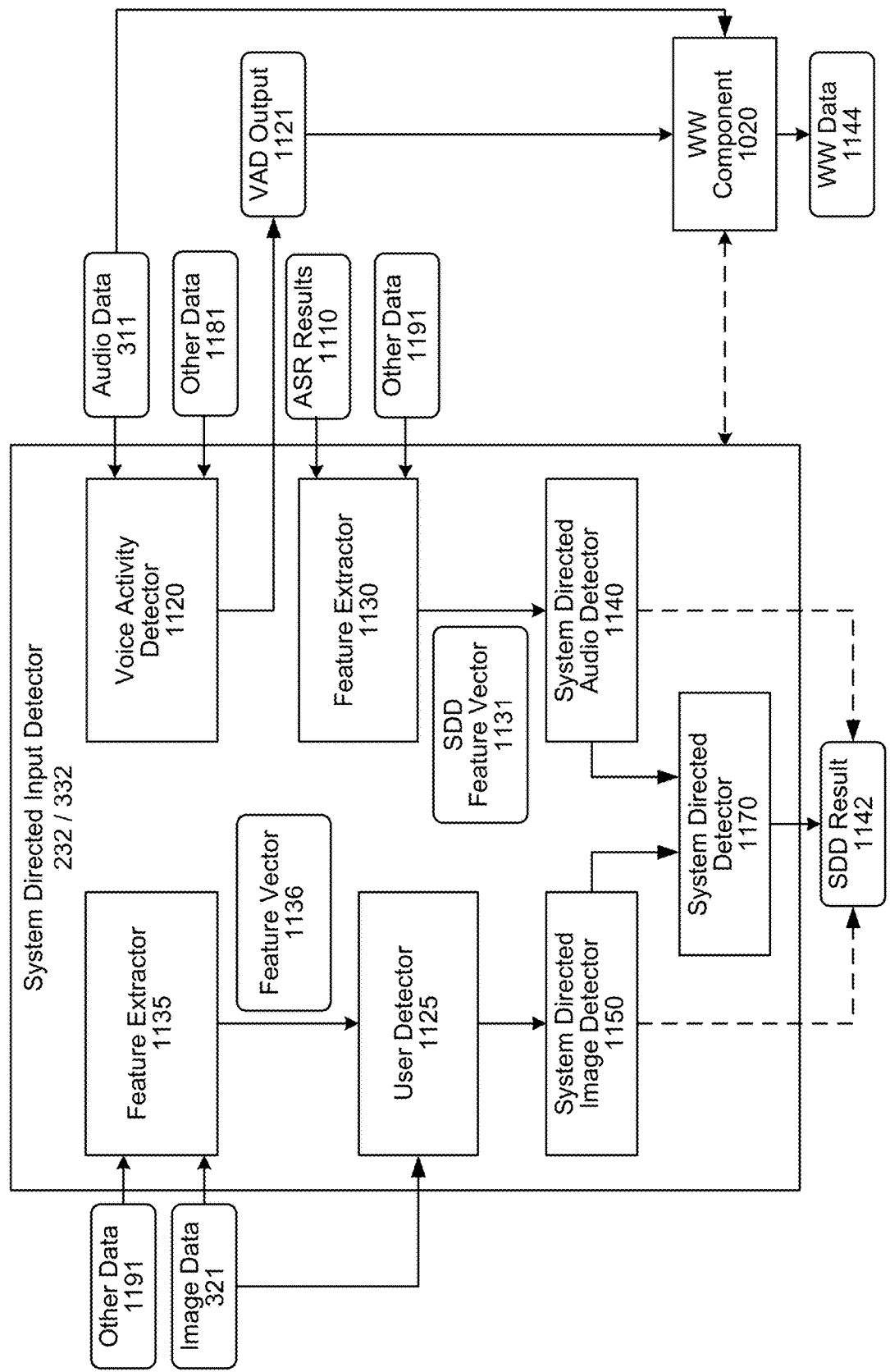
FIG. 11 is a conceptual diagrams of components of a system directed input detector that may detect if input audio data includes system directed speech, according to embodiments of the present disclosure.

FIG. 11 is a conceptual diagrams of components of a system directed input detector (SDD) 232 that may detect if input audio data includes system directed speech, according to embodiments of the present disclosure. As shown in FIG. 11, the SDD 232 may include a number of different components to determine if audio data or other data is directed to the device/system. First, the SDD 232 may include a voice activity detector (VAD) 1120. The VAD 1120 may operate to detect whether the incoming audio data (e.g., audio data 111 and/or 311) includes speech or not. The VAD output 1121 may be a binary indicator. Thus, if the incoming audio data 311 includes speech, the VAD 1120 may output an indicator 1121 that the audio data 311 does includes speech (e.g., a 1) and if the incoming audio data 311 does not includes speech, the VAD 1120 may output an indicator 1121 that the audio data 311 does not includes speech (e.g., a 0). The VAD output 1121 may also be a score (e.g., a number between 0 and 1) corresponding to a likelihood that the audio data 311 includes speech. The VAD 1120 may also perform start-point detection as well as end-point detection where the VAD 1120 determines when speech starts in the audio data 311 and when it ends in the audio data 311. Thus the VAD output 1121 may also include indicators of a speech start point and/or a speech endpoint for use by other components of the system. (For example, the start-point and end-points may demarcate the audio data 311 that is sent to the speech processing component 240.) The VAD output 1121 may be associated with a same unique ID as the audio data 311 for purposes of tracking system processing across various components.

The VAD 1120 may operate using a variety of VAD techniques, including those described above with regard to VAD operations performed by device 110. The VAD may be configured to be robust to background noise so as to accurately detect when audio data actually includes speech or not. The VAD 1120 may operate on raw audio data 111 and/or 311 such as that sent by device 110 or may operate on feature vectors or other data representing the audio data 311. For example, the VAD 1120 may take the form of a deep neural network (DNN) and may operate on a single feature vector representing the entirety of audio data 311 received from the device or may operate on multiple feature vectors, for example feature vectors representing frames of audio data where each frame covers a certain amount of time of audio data (e.g., 25 ms). The VAD 1120 may also operate on other data 1181 that may be useful in detecting voice activity in the audio data 311. For example, the other data 1181 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 311 to determine if that voice matches a voice in the reference section of speech. If the voices match, that may be an indicator to the VAD 1120 that speech was detected. If not, that may be an indicator to the VAD 1120 that speech was not detected. (For example, a representation may be taken of voice data in the first input audio data which may then be compared to the second input audio data to see if the voices match. If they do (or do not) that information may be considered by the VAD 1120.) The VAD 1120 may also consider other data when determining if speech was detected. The VAD 1120 may also consider speaker ID information (such as may be output by user-recognition component 395), directionality data that may indicate what direction (relative to the capture device 110) the incoming audio was received from. Such directionality data may be received from the device 110 and may have been determined by a beamformer or other component of device 110. The VAD 1120 may also consider data regarding a previous utterance which may indicate whether the further audio data received by the system is likely to include speech. Other VAD techniques may also be used.

If the VAD output 1121 indicates that no speech was detected the system (through orchestrator component 230 or some other component) may discontinue processing with regard to the audio data 311, thus saving computing resources that might otherwise have been spent on other processes (e.g., ASR for the audio data 311, etc.). If the VAD output 1121 indicates that speech was detected, the system may make a determination as to whether the speech was or was not directed to the speech-processing system. Such a determination may be made by the system directed audio detector 1140. The system directed audio detector 1140 may include a trained model, such as a DNN, that operates on a feature vector which represent certain data that may be useful in determining whether or not speech is directed to the system. To create the feature vector operable by the system directed audio detector 1140, a feature extractor 1130 may be used. The feature extractor 1130 may input ASR results 1110 which include results from the processing of the audio data 311 by the ASR component 350. For privacy protection purposes, in certain configurations the ASR results 1110 may be obtained from a LP component 392/ASR component 350 located on device 110 or on a home remote component as opposed to a LP component 392/ASR component 350 located on a cloud or other remote system 220 so that audio data 311 is not sent remote from the user's home unless the SDD 232 has determined that the input is system directed. Though this may be adjusted depending on user preferences/ system configuration.

The ASR results 1110 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1110 may include a trellis, which may include a raw search graph as scored during ASR decoding. The ASR results 1110 may also include a lattice, which may be a trellis as scored that has been pruned to remove certain hypotheses that do not exceed a score threshold or number of hypotheses threshold. The ASR results 1110 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1110 may also include corresponding respective scores (such as for a trellis, lattice, confusion network, individual hypothesis, N-best list, etc.)

The ASR results 1110 (or other data 1191) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 350 being less confident about its best hypothesis, which in turn may correlate to detected speech not being device directed. The entropy may be a feature included in other data 1191 to be considered by the system directed audio detector 1140.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 350 is less confident about the top hypothesis, which may correlate to detected speech not being device directed. Other such features or data from the ASR results 1110 may also be used as other data 1191.

The ASR results 1110 may be represented in a system directed detector (SDD) feature vector 1131 that can be used to determine whether speech was system-directed. The feature vector 1131 may represent the ASR results 1110 but may also represent audio data 311 (which may be input to feature extractor 1130) or other information. Such ASR results may be helpful in determining if speech was system-directed. For example, if ASR results include a high scoring single hypothesis, that may indicate that the speech represented in the audio data 311 is directed at, and intended for, the device 110. If, however, ASR results do not include a single high scoring hypothesis, but rather many lower scoring hypotheses, that may indicate some confusion on the part of the ASR component 350 and may also indicate that the speech represented in the audio data 311 was not directed at, nor intended for, the device 110.

The ASR results 1110 may include complete ASR results, for example ASR results corresponding to all speech between a startpoint and endpoint (such as a complete lattice, etc.). In this configuration the system may wait until all ASR processing for a certain input audio has been completed before operating the feature extractor 1130 and system directed audio detector 1140. Thus the system directed audio detector 1140 may receive a feature vector 1131 that includes all the representations of the audio data 311 created by the feature extractor 1130. The system directed audio detector 1140 may then operate a trained model (such as a DNN) on the feature vector 1131 to determine a score corresponding to a likelihood that the audio data 311 includes a representation of system-directed speech. If the score is above a threshold, the system directed audio detector 1140 may determine that the audio data 311 does include a representation of system-directed speech. The SDD result 1142 may include an indicator of whether the audio data includes system-directed speech, a score, and/or some other data.

In one configuration the SDD result 1142 may indicate if a user input/expression is directed at another user. For example, the SDD 232 may process its various input data to determine that a first user is speaking to a second user. This may be indicated with one identifier corresponding to the speaking user and another identifier corresponding to the user to which the speaking user is addressing. User-recognition component 395 be used for such purposes. In this manner the SDD result 1142 may identify the source and target of a user expression. This data may be included, for example, in dialog data that may be used by dialog manager component 272 so that the system may track the sources and targets of various expressions of a conversation/dialog.

The ASR results 1110 may also include incomplete ASR results, for example ASR results corresponding to only some speech between a between a startpoint and endpoint (such as an incomplete lattice, etc.). In this configuration the feature extractor 1130/system directed audio detector 1140 may be configured to operate on incomplete ASR results 1110 and thus the system directed audio detector 1140 may be configured to output an SSD result 1142 that provides an indication as to whether the portion of audio data processed (that corresponds to the incomplete ASR results) corresponds to system directed speech. The system may thus be configured to perform ASR at least partially in parallel with the system directed audio detector 1140 to process ASR result data as it is ready and thus continually update an SDD result 1142. Once the SDD 232 has processed enough ASR results and/or the SDD result 1142 exceeds a threshold, the system may determine that the audio data 311 includes system-directed speech. Similarly, once the SDD 232 has processed enough ASR results and/or the SDD result 1142 drops below another threshold, the system may determine that the audio data 311 does not include system-directed speech.

The SDD result 1142 may be associated with a same unique ID as the audio data 311 and VAD output 1121 for purposes of tracking system processing across various components.

The feature extractor 1130 may also incorporate in a feature vector 1131 representations of other data 1191. Other data 1191 may include, for example, word embeddings from words output by the ASR component 350 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1130 processing and representing a word embedding in a feature vector 1131 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1191 may also include, for example, NLU output from the NLU component 360 may be considered. Thus, if natural language output data 1385/1325 indicates a high correlation between the audio data 311 and an out-of-domain indication (e.g., no intent classifier scores from intent classifiers of the NLU component 360/460 or overall domain scores from recognizers of the NLU component 360/460 reach a certain confidence threshold), this may indicate that the audio data 311 does not include system-directed speech. Other data 1191 may also include, for example, an indicator of a user/speaker as output user-recognition component 395. Thus, for example, if the user-recognition component 395 does not indicate the presence of a known user, or indicates the presence of a user associated with audio data 311 that was not associated with a previous utterance, this may indicate that the audio data 311 does not include system-directed speech. The other data 1191 may also include an indication that a voice represented in audio data 311 is the same (or different) as the voice detected in previous input audio data corresponding to a previous utterance. The other data 1191 may also include directionality data, for example using beamforming or other audio processing techniques to determine a direction/location of a source of detected speech and whether that source direction/location matches a speaking user. The other data 1191 may also include data indicating that a direction of a user's speech is toward a device 110 or away from a device 110, which may indicate whether the speech was system directed or not.

Other data 1191 may also include image data 321. For example, if image data is detected from one or more devices that are nearby to the device 110 (which may include the device 110 itself) that captured the audio data being processed using the SDD 232, the image data may be processed to determine whether a user is facing an audio capture device for purposes of determining whether speech is system-directed as further explained below.

Other data 1191 may also dialog history data. For example, the other data 1191 may include information about whether a speaker has changed from a previous utterance to the current audio data 311, whether a topic of conversation has changed from a previous utterance to the current audio data, how NLU results from a previous utterance compare to NLU results obtained using the current audio data 311, other system context information. The other data 1191 may also include an indicator as to whether the audio data 311 was received as a result of a wake command or whether the audio data 311 was sent without the device 110 detecting a wake command (e.g., the device 110 being instructed by remote system 220 and/or determining to send the audio data without first detecting a wake command).

Other data 1191 may also include information from the user profile storage 370/470.

Other data 1191 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 1191 may also include acoustic feature data such as pitch, prosody, intonation, volume, or other data descriptive of the speech in the audio data 311. As a user may use a different vocal tone to speak with a machine than with another human, acoustic feature information may be useful in determining if speech is device-directed.

Other data 1191 may also include an indicator that indicates whether the audio data 311 includes a wakeword. For example, if a device 110 detects a wakeword prior to sending the audio data 311 to the remote system 220, the device 110 may send along an indicator that the device 110 detected a wakeword in the audio data 311. In another example, the remote system 220 may include another component that processes incoming audio data 311 to determine if it includes a wakeword. If it does, the component may create an indicator indicating that the audio data 311 includes a wakeword. The indicator may then be included in other data 1191 to be incorporated in the feature vector 1131 and/or otherwise considered by the system directed audio detector 1140.

Other data 1191 may also include device history data such as information about previous operations related to the device 110 that sent the audio data 311. For example, the other data 1191 may include information about a previous utterance that was just executed, where the utterance originated with the same device 110 as a current utterance and the previous utterance was within a certain time window of the current utterance. Device history data may be stored in a manner associated with the device identifier (which may also be included in other data 1191), which may also be used to track other information about the device, such as device hardware, capability, location, etc.

The other data 1191 used by the VAD 1120 may include similar data and/or different data from the other data 1191 used by the feature extractor 1130. The other data 1191 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1140 and/or the VAD 1120) may be based on the data from the previous utterance. For example, a score threshold (for the system directed audio detector 1140 and/or the VAD 1120) may be based on acoustic data from a previous utterance.

The feature extractor 1130 may output a single feature vector 1131 for one utterance/instance of input audio data 311. The feature vector 1131 may consistently be a fixed length, or may be a variable length vector depending on the relevant data available for particular audio data 311. Thus, the system directed audio detector 1140 may output a single SDD result 1142 per utterance/instance of input audio data 311. The SDD result 1142 may be a binary indicator. Thus, if the incoming audio data 311 includes system-directed speech, the system directed audio detector 1140 may output an indicator 1142 that the audio data 311 does includes system-directed speech (e.g., a 1) and if the incoming audio data 311 does not includes system-directed speech, the system directed audio detector 1140 may output an indicator 1142 that the audio data 311 does not system-directed includes speech (e.g., a 0). The SDD result 1142 may also be a score (e.g., a number between 0 and 1) corresponding to a likelihood that the audio data 311 includes system-directed speech. Although not illustrated in FIG. 11, the flow of data to and from the SDD 232 may be managed by the orchestrator component 230 or by one or more other components.

The trained model(s) of the system directed audio detector 1140 may be trained on many different examples of SDD feature vectors that include both positive and negative training samples (e.g., samples that both represent system-directed speech and non-system directed speech) so that the DNN and/or other trained model of the system directed audio detector 1140 may be capable of robustly detecting when speech is system-directed versus when speech is not system-directed.

A further input to the SDD 232 may include output data from TTS component 380 to avoid synthesized speech output by the system being confused as system-directed speech spoken by a user. The output from the TTS component 380 may allow the system to ignore synthesized speech in its considerations of whether speech was system directed. The output from the TTS component 380 may also allow the system to determine whether a user captured utterance is responsive to the TTS output, thus improving system operation.

The SDD 232 may also use echo return loss enhancement (ERLE) and/or acoustic echo cancellation (AEC) data to avoid processing of audio data generated by the system.

As shown in FIG. 11, the SDD 232 may simply use audio data to determine whether an input is system directed (for example, system directed audio detector 1140 may output an SDD result 1142). This may be true particularly when no image data is available (for example for a device without a camera). If image data 321 is available, however, the system may also be configured to use image data 321 to determine if an input is system directed. The image data 321 may include image data captured by device 110 and/or image data captured by other device(s) in the environment of device 110. The audio data 311, image data 321 and other data 1181 may be timestamped or otherwise correlated so that the SDD 232 may determine that the data being analyzed all relates to a same time window so as to ensure alignment of data considered with regard to whether a particular input is system directed. For example, the SDD 232 may determine system directedness scores for every frame of audio data/every image of a video stream and may align and/or window them to determine a single overall score for a particular input that corresponds to a group of audio frames/images.

Image data 321 along with other data 1181 may be received by feature extractor 1135. The feature extractor may create one or more feature vectors 1136 which may represent the image data 321/other data 1181. In certain examples, other data 1181 may include data from image processing component which may include information about faces, gesture, etc. detected in the image data 321. For example, user recognition data, motion data, proximity data, etc. For privacy protection purposes, in certain configurations any image processing/results thereof may be obtained from an image processing component located on device 110 or on a home remote component as opposed to a image processing component located on a cloud or other remote system 220 so that image data 321 is not sent remote from the user's home unless the SDD 232 has determined that the input is system directed. Though this may be adjusted depending on user preferences/system configuration.

The feature vector 1136 may be passed to the user detector 1125. The user detector 1125 (which may use various components/operations of image processing component, user-recognition component 395, etc.) may be configured to process image data 321 and/or feature vector 1136 to determine information about the user's behavior which in turn may be used to determine if an input is system directed. For example, the user detector 1125 may be configured to determine the user's position/behavior with respect to device 110/system 100. The user detector 1125 may also be configured to determine whether a user's mouth is opening/closing in a manner that suggests the user is speaking. The user detector 1125 may also be configured to determine whether a user is nodding or shaking his/her head. The user detector 1125 may also be configured to determine whether a user's gaze is directed to the device 110, to another user, or to another object. The user detector 1125 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 1125 may also be configured to determine a user's position/orientation such as facing another user, facing the device 110, whether their back is turned, etc. The user detector 1125 may also be configured to determine relative positions of multiple users that appear in image data (and/or are speaking in audio data 311 which may also be considered by the user detector 1125 along with feature vector 1131), for example which users are closer to a device 110 and which are farther away. The user detector 1125 (and/or other component) may also be configured to identify other objects represented in image data and determine whether objects are relevant to a dialog or system interaction (for example determining if a user is referring to an object through a movement or speech).

The user detector 1125 may operate one or more models (e.g., one or more classifiers) to determine if certain situations are represented in the image data 321. For example the user detector 1125 may employ a visual directedness classifier that may determine, for each face detected in the image data 321 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3d angle of the face and predict a directness score based on the 3d angle.

The user detector 1125 (or other component(s) such as those in image processing) may be configured to track a face in image data to determine which faces represented may belong to a same person. The system may use an IOU based tracker, a mean-shift based tracker, a particle filter based tracker, or other technique.

The user detector 1125 (or other component(s) such as those in user-recognition component 395) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 1150 may then determine, based on information from the user detector 1125 as based on the image data whether an input relating to the image data is system directed. The system directed image detector 1150 may also operate on other input data, for example image data including raw image data 321, image data including feature data 1136 based on raw image data, other data 1181, or other data. The determination by the system directed image detector 1150 may result in a score indicating whether the input is system directed based on the image data. If no audio data is available, the indication may be output as SDD result 1142. If audio data is available, the indication may be sent to system directed detector 1170 which may consider information from both system directed audio detector 1140 and system directed image detector 1150. The system directed detector 1170 may then process the data from both system directed audio detector 1140 and system directed image detector 1150 to come up with an overall determination as to whether an input was system directed, which may be output as SDD result 1142. The system directed detector 1170 may consider not only data output from system directed audio detector 1140 and system directed image detector 1150 but also other data/metadata corresponding to the input (for example, image data/feature data 1136, audio data/feature data 1131, image data 321, audio data 311, or the like discussed with regard to FIG. 11. The system directed detector 1170 may include one or more models which may analyze the various input data to make a determination regarding SDD result 1142.

In one example the determination of the system directed detector 1170 may be based on "AND" logic, for example determining an input is system directed only if affirmative data is received from both system directed audio detector 1140 and system directed image detector 1150. In another example the determination of the system directed detector 1170 may be based on "OR" logic, for example determining an input is system directed if affirmative data is received from either system directed audio detector 1140 or system directed image detector 1150. In another example the data received from system directed audio detector 1140 and system directed image detector 1150 are weighted individually based on other information available to system directed detector 1170 to determine to what extend audio and/or image data should impact the decision of whether an input is system directed.

The SDD 232 may also receive information from a wakeword detection component 221. For example, an indication that a wakeword was detected (e.g., WW data 1144) may be considered by the SDD 232 (e.g., by system directed audio detector 1140, system directed detector 1170, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to the LP component 392). If an input is determined not to be system directed, the system may take no further action regarding the data related to the input and may allow it to be deleted. In certain configurations, to maintain privacy, the operations to determine whether an input is system directed are performed by device 110 (or home server(s) 220) and only if the input is determined to be system directed is further data (such as audio data 311 or image data 321) sent to a remote system 220 that is outside a user's home or other direct control.

In multi-user dialog mode (MUD) the system may operate as follows to determine whether an input is system directed. The first turn of a MUD interaction begins, for example, with a wakeword triggered utterance to begin MUD mode. For example, "Alexa, begin multi-user dialog mode." The system 220 may then process that utterance using speech processing and determine an intent to enter the MUD mode. The system 220 may then direct the device 110 to enter into MUD mode, which may result in changing a mode of operation of the wakeword detection component 221 and may also involve a visual or other indicator to be output by the device 110 to indicate that MUD mode is on, such as a different color light ring or line (which may indicate to the user(s) that a wakeword is not necessary for the system to process an input). This may then also activate certain components of an image processing component such as the SDD 232 to perform computer vision (CV) processing to identify face(s) in image data, perform gaze detection, etc. Entering MUD mode may also configure the device to more easily detect if a user is speaking during TTS output by the device 110, thus more easily allowing a user to "interrupt" the system.

While MUD mode is active the SDD 232 may process incoming image data 321, audio data 311 and other data 1181 to determine if an input is system directed. If a system-directed input is detected, the system 220 may halt TTS output (or lower the volume of an ongoing TTS output) and may send the corresponding input/audio data may be processed by the system (for example by the LP component 392, dialog manager component 272, etc.) to determine how to process the input according to the ongoing dialog. The system may also process input data with user-recognition component 395 to identify a user that is providing the input to the system (e.g., identify which user is speaking). The system may then customize its responses to the user, for example by identifying the user by name, considering the user's preferences to provide output data, etc. For example, if two users are engaged in a MUD dialog the system may say to one whose user profile data indicates a preference for pepperoni pizza "Jenn, for you I recommend the pepperoni pizza" but for another user whose user profile data indicates that the user is a vegetarian, the system may say "Dave, for you I recommend the vegetarian pizza." Upon conclusion of MUD mode, the device 110 may return to normal operation, for example by disabling a visual indicator of MUD mode, returning the wakeword detection component 221 to normal operation, etc.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
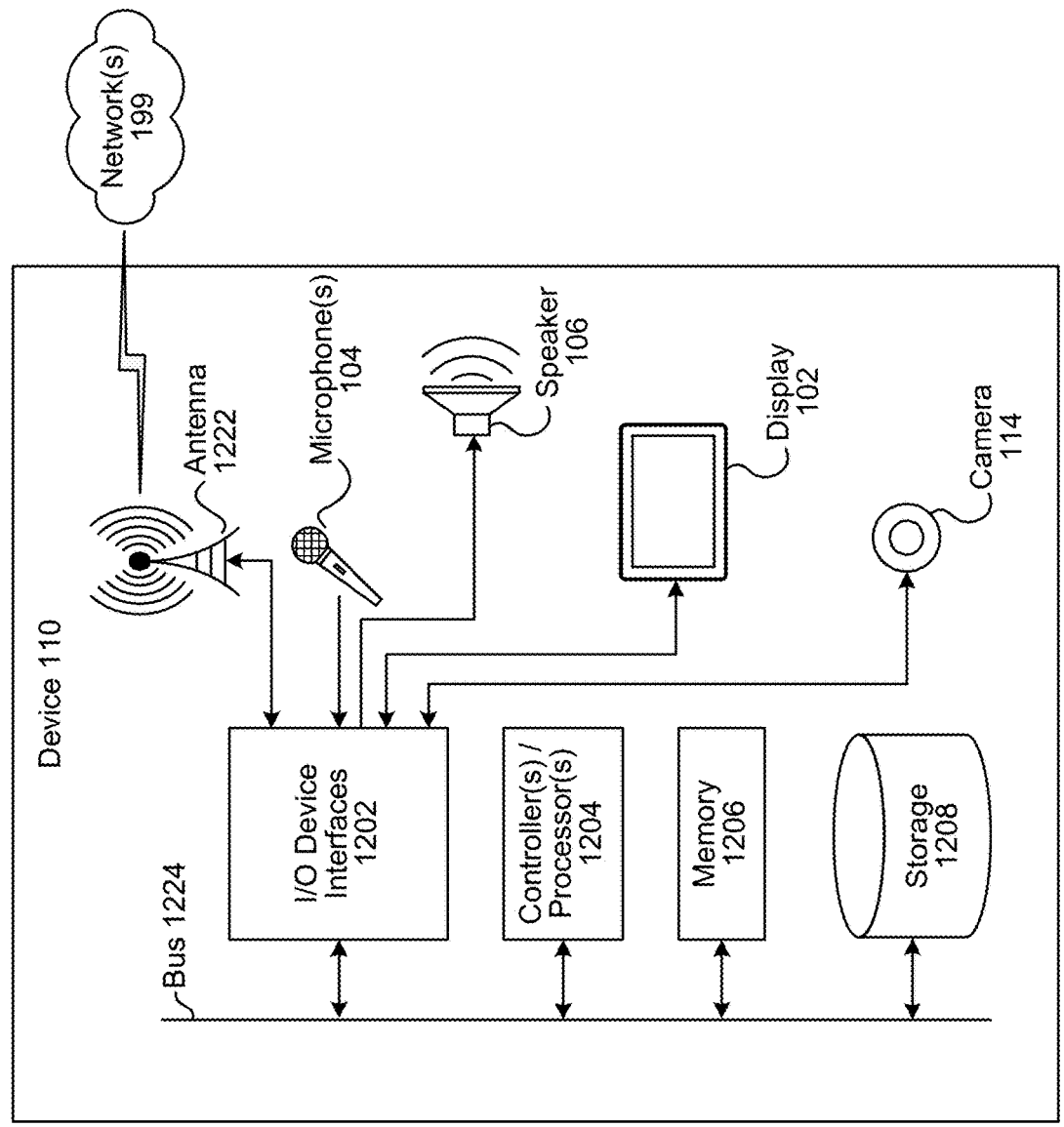
FIG. 12 is a block diagram conceptually illustrating example components of a device, according to embodiments of the present disclosure.
Figure 13:
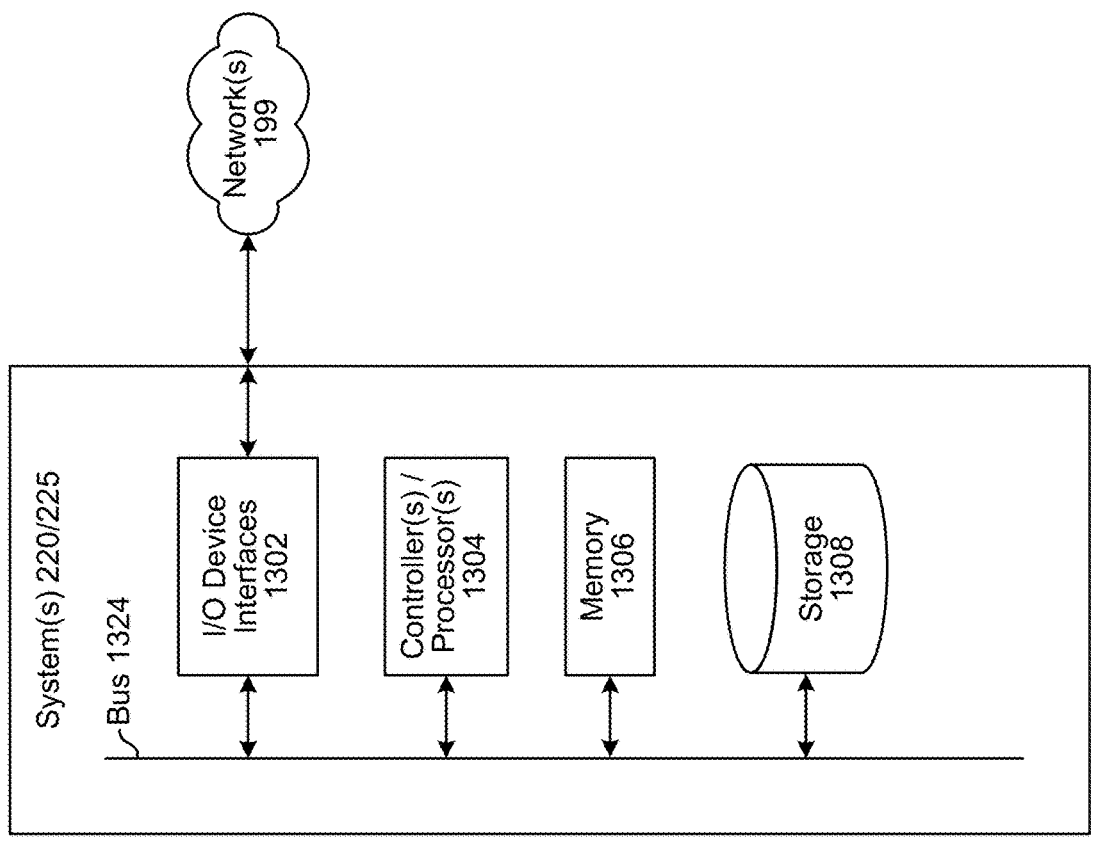
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the natural language command processing system 220, which may assist with ASR processing, NLU processing, etc., and a skill support system 225. A system (220/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (220/225) may be included in the overall system 100 of the present disclosure, such as one or more natural language processing systems 220 for performing ASR processing, one or more natural language processing systems 220 for performing NLU processing, one or more skill support systems 225, etc. In operation, each of these systems may include computer-readable and computer-executable instructions that reside on the respective system (220/225), as will be discussed further below.

Each of these devices (110/220/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/220/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/220/225) may also be connected to removable or external non-volatile memory and/or storage (such as a removable memory card, memory key drive, networked storage, etc.) through respective input/output device interfaces (1202/1302).

Computer instructions for operating each device (110/220/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/220/225) includes input/output device interfaces (1202/1302). A variety of components may be connected through the input/output device interfaces (1202/1302), as will be discussed further below. Additionally, each device (110/220/225) may include an address/data bus (1224/1324) for conveying data among components of the respective device. Each component within a device (110/220/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 106, a wired headset or a wireless headset (not illustrated), or other component capable of outputting audio. The device 110 may also include an audio capture component. The audio capture component may be, for example, a microphone 104 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 102 for displaying content. The device 110 may further include a camera 114.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 220, or a skill support system 225 may include their own dedicated processors, memory, and/or storage. Alternatively, one or more of the components of the device(s) 110, the natural language command processing system 220, or a skill support system 225 may utilize the I/O interfaces (1202/1302), processor(s) (1204/1304), memory (1206/1306), and/or storage (1208/1308) of the device(s) 110, natural language command processing system 220, or the skill support system 225, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 220, and a skill support system 225, as described herein, are illustrative, and may be located as a stand-alone device or may be included, in whole or in part, as a component of a larger device or system.

Figure 14:
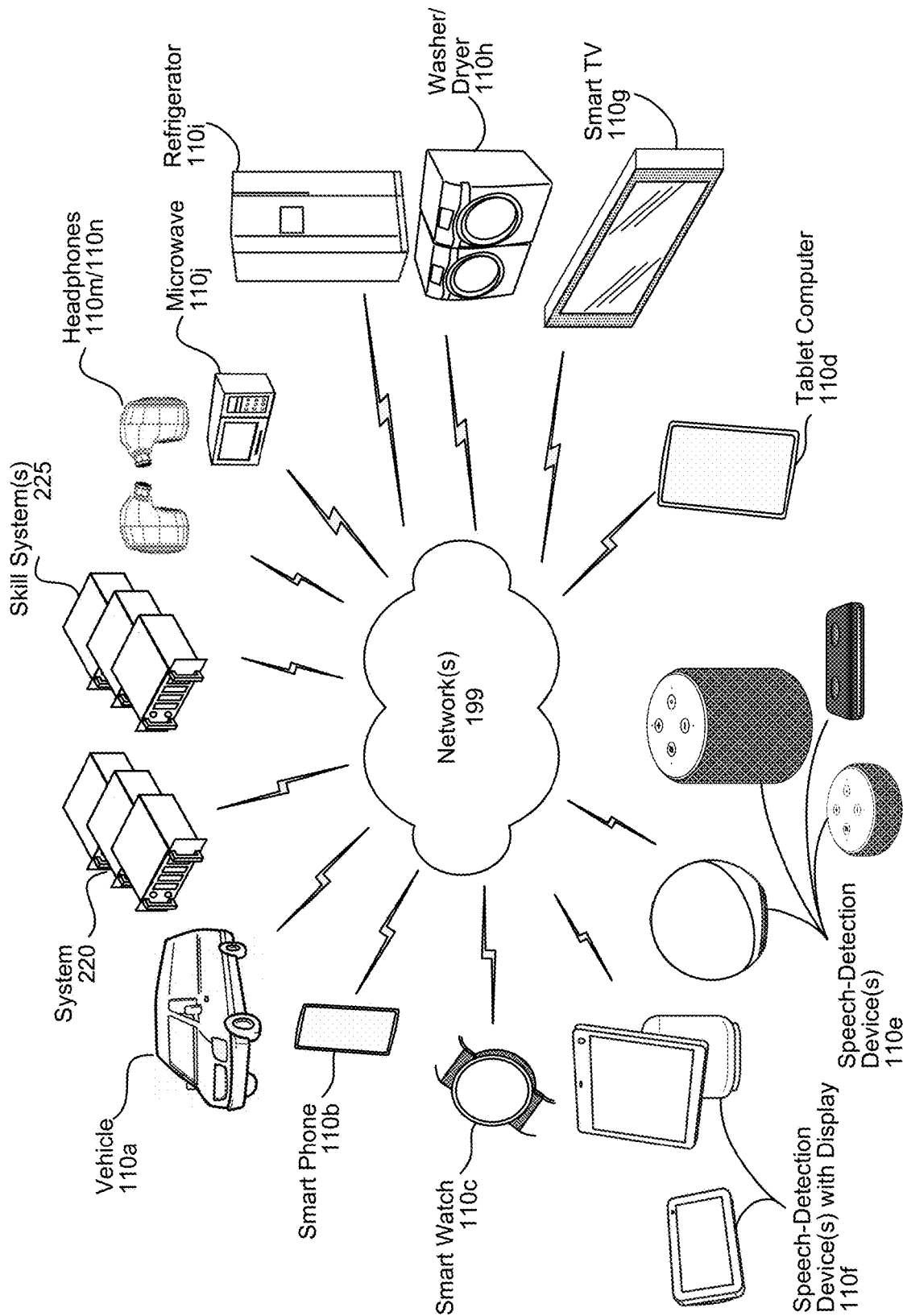
FIG. 14 illustrates an example of a computer network for use with the overall system, according to embodiments of the present disclosure.

As illustrated in FIG. 14, multiple devices (110a-110n, 220, 225) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 220, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of the natural language command processing system 220.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a device, an indication to begin receiving audio;
   in response to the indication, generating first audio data corresponding to a first utterance;
   generating a first encryption key;
   generating first encrypted data using the first audio data and the first encryption key;
   sending the first encrypted data to a first component associated with a first speech processing system;
   sending the first encrypted data to a second component associated with a second speech processing system different from the first speech processing system;
   sending the first audio data to a wakeword detection component;
   receiving, from the wakeword detection component, an indication that the first audio data includes a representation of a first wakeword corresponding to the first speech processing system;
   in response to the indication that the first audio data includes the representation of the first wakeword, sending the first encryption key to the first speech processing system but not to the second speech processing system to cause the first speech processing system to perform speech processing using the first encrypted data and the first encryption key; and
   closing a session corresponding to the first utterance with the second speech processing system.

2. The computer-implemented method of claim 1, further comprising:
   generating second audio data corresponding to a second utterance;
   sending the second audio data to a speech processing component of the device;
   generating a second encryption key;
   generating second encrypted data using the second audio data and the second encryption key;
   sending the second encrypted data to the first speech processing system;
   determining that the device cannot perform an action responsive to the second audio data; and
   in response to determining that the device cannot perform an action responsive to the first audio data, sending the second encryption key to the first speech processing system.

3. The computer-implemented method of claim 1, further comprising:
   determining a first portion of the first audio data corresponding to a first frequency range of the first audio data;
   determining a second portion of the first audio data corresponding to a second frequency range of the first audio data;
   generating a second encryption key;
   generating a first encrypted portion using the first encryption key and the first portion;
   generating a second encrypted portion using the second encryption key and the second portion;
   generating the first encrypted data using the first encrypted portion and the second encrypted portion;
   receiving, from the first speech processing system, an indication that higher fidelity audio data is needed for speech recognition; and
   sending the second encryption key to the first speech processing system such that the second speech processing system decrypts both the first encrypted portion and the second encrypted portion to generate second audio data corresponding to the first frequency range and the second frequency range.

4. The computer-implemented method of claim 1, further comprising:
   receiving, from the first speech processing system, an indication that the first speech processing system cannot perform an action responsive to the first encrypted data;
   in response to the indication that the first speech processing system cannot perform an action responsive to the first encrypted data, sending the first encryption key to the second speech processing system to cause the second speech processing system to perform speech processing using the first encrypted data and the first encryption key; and
   terminating transmission of any remaining data corresponding to the first utterance to the first speech processing system.

5. A computer-implemented method comprising:
   generating, by a first device, first audio data representing a first utterance;
   generating first encrypted data using the first audio data;
   sending the first encrypted data to a second device;
   sending the first encrypted data to a third device;
   receiving an indication that the first utterance corresponds to the second device; and
   in response to receiving the indication, sending a first encryption key for decrypting the first encrypted data to the second device but not the third device.

6. The computer-implemented method of claim 5, further comprising:
   generating second audio data corresponding to a second utterance;
   sending the second audio data to a speech processing component of the first device;
   generating second encrypted data using the second audio data;
   sending the second encrypted data to the second device;
   determining, by the first device, that the second device is to process the second audio data; and
   in response to determining that the second device is to process the second audio data, sending a second encryption key for decrypting the second encrypted data to the second device.

7. The computer-implemented method of claim 5, further comprising:
   receiving, from the second device, a request for higher fidelity audio data;
   generating a second encryption key for the first encrypted data, the first encryption key and the second encryption key operable to decrypt the first encrypted data into audio data having a higher fidelity than audio data generated using only the first encryption key; and sending the second encryption key to the second device.

8. The computer-implemented method of claim 7, further comprising:

determining a first portion of the audio data;

determining a second portion of the audio data;

generating a first encrypted portion using the first encryption key and the first portion;

generating a second encrypted portion using the second encryption key and the second portion; and generating the first encrypted data using the first encrypted portion and the second encrypted portion.

9. The computer-implemented method of claim 5, further comprising:

determining that the third device is to process the first encrypted data;

in response to determining that the third device is to process the first encrypted data, sending the first encryption key to the third device; and closing a communications session corresponding to the first utterance with the second device.

10. The computer-implemented method of claim 5, further comprising:

receiving an indication to begin receiving audio for processing by the third device;

in response to receiving the indication to begin receiving the audio, receiving the first audio data;

sending the first audio data to a wakeword detection component;

receiving an indication that the first audio data includes a representation of a first wakeword corresponding to the second device;

in response to the indication that the first audio data includes the representation of the first wakeword, sending the first encryption key to the second device but not the third device; and closing a communications session corresponding to the first utterance with the third device.

11. The computer-implemented method of claim 5, further comprising:

determining second audio data corresponding to a second utterance;

generating second encrypted data using the second audio data;

sending the second encrypted data to the second device;

sending the second encrypted data to the third device;

receiving an indication that no wakeword was represented in the second audio data; and in response to the indication that no wakeword was represented in the second audio data:

closing a communications session corresponding to the first utterance with the second device, closing a communications session corresponding to the first utterance with the third device, and sending no encryption key corresponding to the second encrypted data to the second device or the third device.

12. The computer-implemented method of claim 5, further comprising:

initiating a dialog session corresponding to the first audio data;

receiving second audio data;

determining the second audio data corresponds to the dialog session; and in response to determining that the second audio data corresponds to the dialog session, sending the second audio data to the second device without separate encryption of the second audio data.

13. The computer-implemented method of claim 5, further comprising:

receiving image data;

generating a second encryption key;

generating second encrypted data using the image data and the second encryption key;

sending the second encrypted data to the second device;

after sending the second encrypted data to the second device, determining that the second device is to process the image data; and in response to determining that the second device is to process the image data, sending the second encryption key to the second device.

14. A first system, comprising:

at least one processor; and at least one memory comprising instructions that, when executed by the at least one processor, cause the first system to:

generate first audio data corresponding to a first utterance;

generate first encrypted data using the first audio data;

send the first encrypted data to a second system;

send the first encrypted data to a third system;

receive an indication that the first utterance corresponds to the second system; and in response to receiving the indication, send a first encryption key for decrypting the first encrypted data to the second system but not the third system.

15. The first system of claim 14, wherein the at least one memory further comprises instructions that, when executed by the at least one processor, further cause the first system to:

generate second audio data corresponding to a second utterance;

send the second audio data to a speech processing component of the first system;

generate second encrypted data using the second audio data;

send the second encrypted data to the second system;

determine that the second system is to process the second audio data; and in response to the determination that the second system is to process the second audio data, send a second encryption key for decrypting the second encrypted data to the second system.

16. The first system of claim 14, wherein the at least one memory further comprises instructions that, when executed by the at least one processor, further cause the first system to:

receive, from the second system, a request for higher fidelity audio data;

generate a second encryption key for the first encrypted data, the first encryption key and the second encryption key operable to decrypt the first encrypted data into audio data having a one or more of a higher fidelity than audio data generated using only the first encryption key; and send the second encryption key to the second system.

17. The first system of claim 14, wherein the at least one memory further comprises instructions that, when executed by the at least one processor, further cause the first system to:
- determine that the third system is to process the first encrypted data;
- in response to the determination that the third system is to process the first encrypted data, send the first encryption key to the third system; and
- closing a communications session corresponding to the first utterance with the second system.

18. The first system of claim 14, wherein the at least one memory further comprises instructions that, when executed by the at least one processor, further cause the first system to:
- receive an indication to begin receiving audio for processing by the third system;
- in response to receiving the indication to begin receiving the audio, receive the first audio data;
- send the first audio data to a wakeword detection component;
- receive an indication that the first audio data includes a representation of a first wakeword corresponding to the second system;
- in response to the indication that the first audio data includes the representation of the first wakeword, send the first encryption key to the second system but not the third system; and
- closing a communications session corresponding to the first utterance with the third system.

19. The first system of claim 14, wherein the at least one memory further comprises instructions that, when executed by the at least one processor, further cause the first system to:
- determine second audio data corresponding to a second utterance;
- generate second encrypted data using the second audio data;
- send the second encrypted data to the second system;
- send the second encrypted data to the third system;
- receive an indication that no wakeword was represented in the second audio data; and
- in response to the indication that no wakeword was represented in the second audio data:
  - closing a communications session corresponding to the first utterance with the second system,
  - closing a communications session corresponding to the first utterance with the third system, and
  - send no encryption key corresponding to the second encrypted data to the second system or the third system.

20. The first system of claim 14, wherein the at least one memory further comprises instructions that, when executed by the at least one processor, further cause the first system to:
- initiate a dialog session corresponding to the first audio data;
- receive second audio data;
- determine the second audio data corresponds to the dialog session; and
- in response to determining that the second audio data corresponds to the dialog session, send the second audio data to the second system without separate encryption of the second audio data.

* * * * *